United States Patent

Hayashi et al.

(10) Patent No.: US 9,003,883 B2
(45) Date of Patent: Apr. 14, 2015

(54) ANGULAR VELOCITY SENSOR AND SYNCHRONOUS DETECTION CIRCUIT USED THEREIN

(75) Inventors: Kei Hayashi, Kyoto (JP); Nobuyuki Yamada, Kyoto (JP); Takeshi Yoshida, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 467 days.

(21) Appl. No.: 13/380,667

(22) PCT Filed: Jun. 21, 2010

(86) PCT No.: PCT/JP2010/060457
§ 371 (c)(1),
(2), (4) Date: Dec. 23, 2011

(87) PCT Pub. No.: WO2010/150736
PCT Pub. Date: Dec. 29, 2010

(65) Prior Publication Data
US 2012/0096942 A1  Apr. 26, 2012

(30) Foreign Application Priority Data

Jun. 26, 2009 (JP) ................. 2009-152649
Oct. 16, 2009 (JP) ................. 2009-238808
Dec. 8, 2009 (JP) ................. 2009-278596

(51) Int. Cl.
*G01C 19/56* (2012.01)
*G01C 19/5776* (2012.01)

(52) U.S. Cl.
CPC ............ *G01C 19/56* (2013.01); *G01C 19/5776* (2013.01)

(58) Field of Classification Search
CPC .... G01C 19/5719; G01C 19/56; G01P 15/18; G01P 15/125

USPC ........................................ 73/504.12
See application file for complete search history.

(56) References Cited

U.S. PATENT DOCUMENTS 5,608,525 A  3/1997  Kumagai et al.
5,646,346 A  7/1997  Okada
5,817,940 A  10/1998  Kobayashi et al.
(Continued)

FOREIGN PATENT DOCUMENTS

JP  07-167660  7/1995
JP  07-270168  10/1995
(Continued)

OTHER PUBLICATIONS

European Patent Office, official communication in application No. 10792054.8, dated Jul. 7, 2014.

*Primary Examiner* — Hezron E Williams
*Assistant Examiner* — Xin Zhong
(74) *Attorney, Agent, or Firm* — Fish & Richardson P.C.

(57) ABSTRACT

In an angular velocity sensor, an upper electrode of a first piezoelectric element and a lower electrode of a second piezoelectric element are connected to an input terminal of a first Q/V conversion circuit, and a lower electrode of the first piezoelectric element and an upper electrode of the second piezoelectric element are connected to an input terminal of a second Q/V conversion circuit. Thus, vibration noise components of the quantities of charge generated at the first and second piezoelectric elements are cancelled out, and Coriolis components of the quantities of charge generated at the first and second piezoelectric elements are added, whereby only the Coriolis components are extracted.

14 Claims, 21 Drawing Sheets

(56) References Cited

U.S. PATENT DOCUMENTS

| | | | |
|---|---|---|---|
| 6,255,760 B1 | 7/2001 | Hasegawa et al. | |
| 2005/0001633 A1* | 1/2005 | Okushima et al. | 324/658 |
| 2009/0126490 A1 | 5/2009 | Sameshima | |
| 2010/0013688 A1 | 1/2010 | Murakami et al. | |

FOREIGN PATENT DOCUMENTS

| | | |
|---|---|---|
| JP | 08-35981 | 2/1996 |
| JP | 09-250929 | 9/1997 |
| JP | 10-234094 | 9/1998 |
| JP | 2001-50752 | 2/2001 |
| JP | 2002-350138 | 12/2002 |
| JP | 2003-87057 | 3/2003 |
| JP | 3135181 U | 9/2007 |
| JP | 2007-309946 | 11/2007 |
| JP | 2008-206134 A | 9/2008 |
| JP | 2008-224230 | 9/2008 |
| JP | 2008-309531 | 12/2008 |
| JP | 2009-47649 | 3/2009 |
| JP | 2009-128135 | 6/2009 |
| JP | 2009-168588 | 7/2009 |

* cited by examiner

FIG.1
(a)
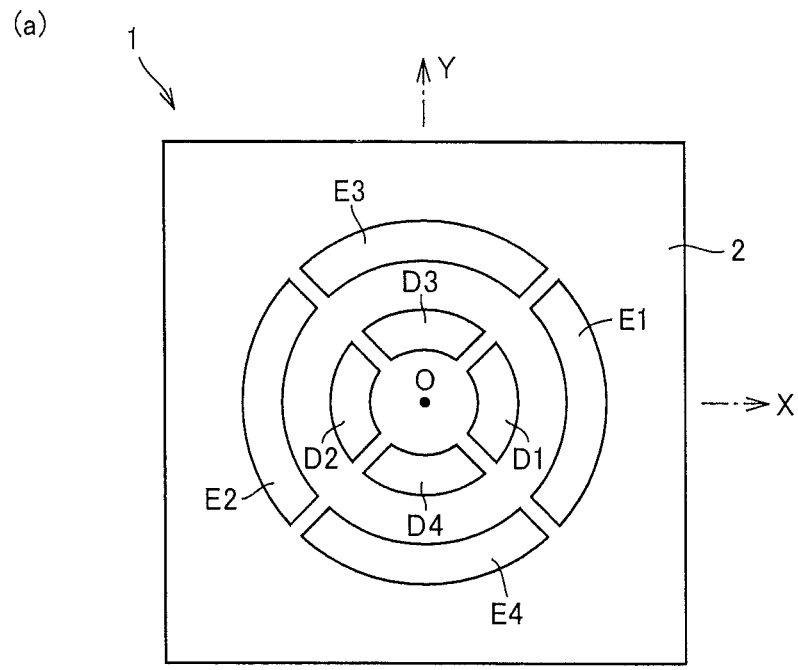
(b)
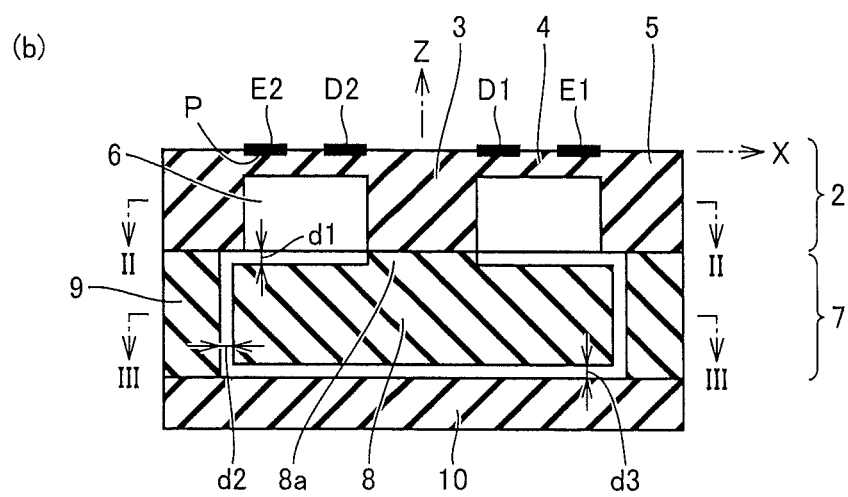

FIG.15
(a) PRESENT INVENTION
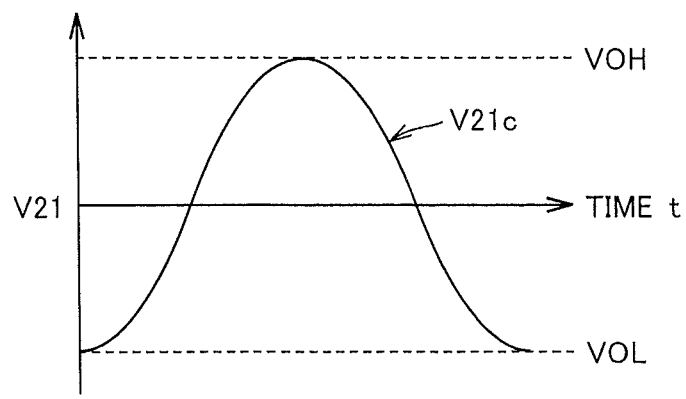
(b) COMPARATIVE EXAMPLE
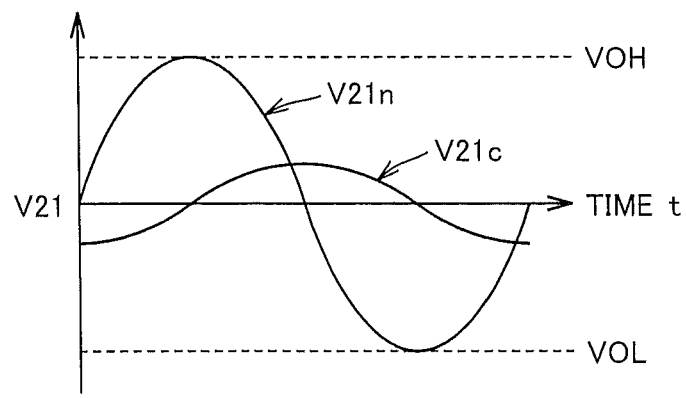

FIG.17
(a)
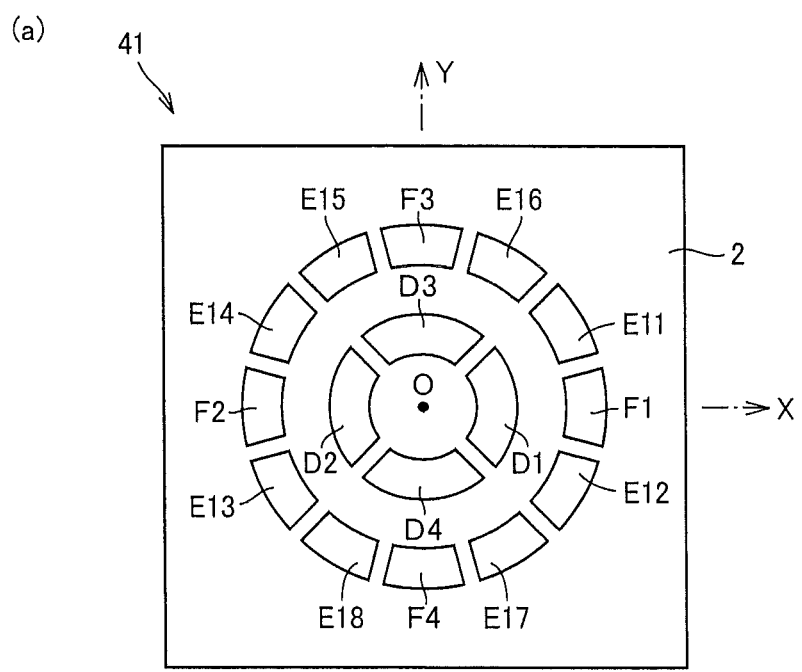
(b)
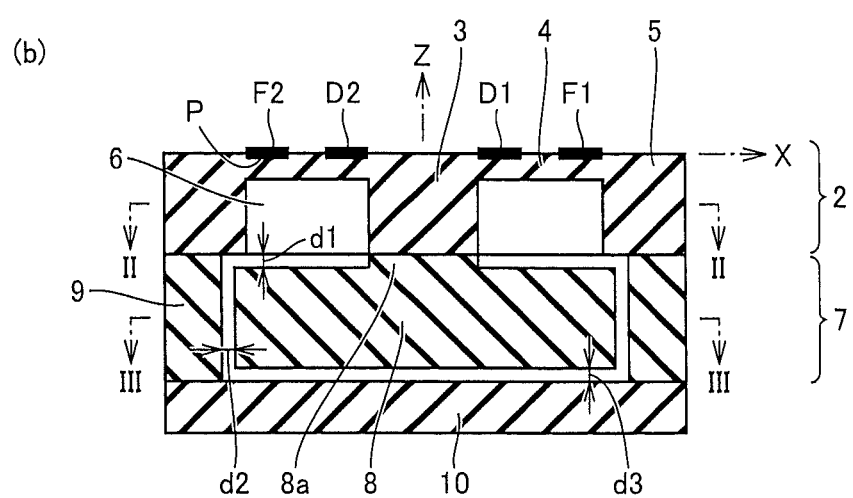

ANGULAR VELOCITY SENSOR AND SYNCHRONOUS DETECTION CIRCUIT USED THEREIN

TECHNICAL FIELD

The present invention relates to an angular velocity sensor and a synchronous detection circuit used therein, and more particularly to an angular velocity sensor for detecting angular velocity based on Coriolis force acting on a vibrating mass portion, and a synchronous detection circuit used therein.

BACKGROUND ART

Angular velocity sensors are installed in, for example, digital cameras, video cameras, mobile phones, car navigation systems, and any other electronic equipment for detecting a physical quantity changing with external factors. Such angular velocity sensors detect a physical quantity such as angular velocity for use in, for example, image stabilization for digital cameras and self-contained navigation for attitude control. They are also used in navigation using GPS (Global Positioning System).

Angular velocity sensors using piezoelectric elements are known as one of angular velocity sensors. Angular velocity sensors using piezoelectric elements are installed in many devices.

An angular velocity sensor in Japanese Utility Model Registration No. 3135181 (Patent Literature 1) and Japanese Patent Laying-Open No. 8-35981 (Patent Literature 2) includes an annular flexible portion, a mass portion supported on an inner edge of the flexible portion, a support portion supporting an outer edge of the flexible portion, and first and second piezoelectric elements. The flexible portion is arranged along an XY plane such that the Z axis passes through the center thereof. The first piezoelectric element is provided on the positive side of the X axis (or Y axis) and fixed on the front surface of the flexible portion. The second piezoelectric element is provided on the negative side of the X axis (or Y axis) and fixed on the front surface of the flexible portion. This angular velocity sensor obtains the angular velocity around the Y axis (or X axis) with the mass portion vibrated in the Z axis direction, based on the quantity of charge generated at each of the first and second piezoelectric elements.

In an angular velocity sensor in Japanese Patent Laying-Open No. 7-167660 (Patent Literature 3), first to third piezoelectric elements are fixed to a gyro oscillator. The first piezoelectric element is used to vibrate the gyro oscillator, the second piezoelectric element is used to detect vibration of the gyro oscillator, and the third piezoelectric element is used to detect Coriolis force. The output signal of the second piezoelectric element is amplified and delayed by 90 degrees to generate a driving signal for the first piezoelectric element.

In the angular velocity sensor using piezoelectric elements, the electric charge output by the piezoelectric element is converted into voltage, and an angular velocity signal component is selectively extracted from a sensor signal containing a driving signal component by a synchronous detection circuit and is then converted into direct current. After the detection output is smoothed by a low-pass filter, the DC voltage signal is amplified by an amplification circuit for output.

In such angular velocity sensors, electric charge output by piezoelectric elements becomes extremely weak as the oscillator is reduced in size and weight. Therefore, it is requested for the devices for detecting the angular velocity based on such weak electric charge to be able to detect the angular velocity with no distortion and low noise and with proper gain.

For example, Japanese Patent Laying-Open No. 2009-168588 (Patent Literature 4) describes a synchronous detection circuit which cancels offset voltage, which is noise, from a sensor signal.

In Patent Literature 4, the synchronous detection circuit synchronously detects a sensor signal in synchronization with a sampling pulse for synchronous detection, which has a pulse width shorter than half the cycle of the sensor signal and has the same cycle as the cycle of the sensor signal. In the synchronous detection circuit, the ratio of a detection output with respect to an angular velocity signal component is reduced by removing part of the angular velocity signal component, thereby cancelling positive offset voltage based on DC bias voltage of a signal path.

Japanese Patent Laying-Open No. 2009-128135 (Patent Literature 5), paragraph 116, describes that the S/N ratio can be improved by performing sampling in the vicinity of a period in which the displacement of an angular velocity signal component is greatest.

Japanese Patent Laying-Open No. 2008-224230 (Patent Literature 6), paragraph 93, suggests a technique of adjusting a pulse width of a sampling pulse.

Japanese Patent Laying-Open No. 10-234094 (Patent Literature 7) does not relate to an angular velocity sensor but relates to a speaker device. Patent Literature 7 discloses that hearing decreases in treble frequencies higher than 1 KHz. In the angular velocity sensor of the present invention, it is useful to know the frequency range in which hearing decreases, in determining the frequency of a driving signal.

CITATION LIST

Patent Literature

PTL 1: Japanese Utility Model Registration No. 3135181
PTL 2: Japanese Patent Laying-Open No. 8-35981
PTL 3: Japanese Patent Laying-Open No. 7-167660
PTL 4: Japanese Patent Laying-Open No. 2009-168588
PTL 5: Japanese Patent Laying-Open No. 2009-128135
PTL 6: Japanese Patent Laying-Open No. 2008-224230
PTL 7: Japanese Patent Laying-Open No. 10-234094

SUMMARY OF INVENTION

Technical Problem

However, in the angular velocity sensor in Patent Literatures 1 and 2, the accuracy of detecting the angular velocity is low because the quantity of charge generated at each of the first and second piezoelectric elements includes a vibration noise component generated with vibration of the mass portion and a Coriolis component generated by Coriolis force, and the vibration noise component is greater than the Coriolis component.

In the angular velocity sensor in Patent Literature 3, the frequency of the gyro oscillator is shifted from the resonance frequency, for example, with a temperature change, and the accuracy of detecting the angular velocity is reduced because the driving signal for the first piezoelectric element is generated merely by delaying the output signal from the second piezoelectric element by 90 degrees in the delay circuit.

Patent Literature 4 discloses that the S/N ratio of the synchronous detection circuit can be improved by reducing the duty ratio of the sampling pulse to 50% or smaller. However, the voltage of the detection output is reduced as compared with the maximum value of the angular velocity signal component to be detected, so that the detection efficiency of detecting the angular velocity signal component input to the synchronous detection circuit is reduced.

Patent Literatures 5 and 6 suggest that noise can be reduced by adjusting the pulse width of the sampling pulse. However, any appropriate level of the pulse width or duty ratio is not explicitly specified.

Therefore, a main object of the present invention is to provide an angular velocity sensor capable of detecting angular velocity with high accuracy, and a synchronous detection circuit used therein.

Solution to Problem

An angular velocity sensor according to the present invention includes: an annular flexible portion arranged along an XY plane and having a center through which a Z axis passes through; a mass portion supported on an inner edge of the flexible portion; a support portion for supporting an outer edge of the flexible portion; a driving portion for vibrating the mass portion in a direction of the Z axis; a first piezoelectric element provided on a positive side of an X axis or a Y axis and having a first electrode fixed to a front surface of the flexible portion; a second piezoelectric element provided on a negative side of the X axis or the Y axis and having a first electrode fixed to the front surface of the flexible portion; and an operation circuit for finding an angular velocity around the Y axis or the X axis based on quantities of charge generated at the first and second electrodes of each of the first and second piezoelectric elements. The first and second electrodes of the first piezoelectric element are connected to the second and first electrodes of the second piezoelectric element, respectively.

Another angular velocity sensor according to the present invention includes: an annular flexible portion arranged along an XY plane and having a center through which a Z axis passes through; a mass portion supported on an inner edge of the flexible portion; a support portion for supporting an outer edge of the flexible portion; a driving portion for vibrating the mass portion in a direction of the Z axis; and a detection portion for detecting an angular velocity around an X axis or a Y axis, based on vibration of the mass portion. The driving portion includes a first piezoelectric element fixed to the flexible portion for vibrating the mass portion, a second piezoelectric element fixed to the flexible portion for detecting vibration of the mass portion, a driving circuit for providing a driving signal to the first piezoelectric element, a delay circuit for delaying a phase of the driving signal by 90 degrees, and a phase control circuit for comparing a phase of an output signal of the second piezoelectric element and a phase of an output signal of the delay circuit and controlling the phase of the driving signal such that a phase difference between these signals is eliminated.

A synchronous detection circuit according to the present invention is used in an angular velocity sensor and includes an analog switch and an integration circuit including a resistor element and a capacitor. A sensor signal including a driving signal component and an angular velocity signal component superposed on each other is input to an input terminal of the analog switch, and an input node of the integration circuit is connected to an output terminal of the analog switch. ON/OFF of the analog switch is controlled by a sampling pulse having a same cycle as a cycle of the sensor signal, and a duty ratio of the sampling pulse is less than 50%.

Yet another angular velocity sensor according to the present invention includes two sets of: the synchronous detection circuit as described above; a low-pass filter for removing a high-frequency component from an output signal of the synchronous detection circuit; and a charge amplifier for converting a charge signal into a voltage signal and outputting the voltage signal as the sensor signal to the synchronous detection circuit. The angular velocity sensor further includes: a sensor portion for outputting two charge signals shifted in phase from each other by 180 degrees to the two charge amplifiers, respectively, when angular velocity is detected; and a differential amplifier for amplifying a potential difference between output signals of the two low-pass filters.

In the present invention, the driving signal is defined as a signal provided to the piezoelectric element to vibrate the piezoelectric element. The sensor signal is defined as an output signal of the charge amplifier or an input signal of the synchronous detection circuit. The detection output is defined as an output signal of the synchronous detection circuit. The angular velocity signal component, which is one of two signals included in the sensor signal, is defined as a signal in which charge output by the piezoelectric element as a result of application of angular velocity to the piezoelectric element is converted into voltage by the charge amplifier. The driving signal component, which is one of two signals included in the sensor signal, is defined as a signal in which charge output by the piezoelectric element as a result of application of the driving signal to the piezoelectric element is converted into voltage by the charge amplifier. The zero cross point is defined as a point where voltage is zero in an AC signal, or a point where voltage is equal to a voltage of DC voltage serving as a reference in a signal having DC voltage as a reference superposed on an AC signal.

Advantageous Effects of Invention

In the angular velocity sensor according to the present invention, the first and second electrodes of the first piezoelectric element are connected to the second and first electrodes of the second piezoelectric element, respectively. Therefore, the vibration noise component of the quantity of charge generated at the first piezoelectric element and the vibration noise component of the quantity of charge generated at the second piezoelectric element are cancelled out, and the Coriolis component of the quantity of charge generated at the first piezoelectric element and the Coriolis component of the quantity of charge generated at the second piezoelectric element are added, whereby only the Coriolis component can be extracted. Therefore, the angular velocity can be detected accurately.

Another angular velocity sensor according to the present invention includes a first piezoelectric element for vibrating a mass portion, a second piezoelectric element for detecting vibration of the mass portion, a driving circuit for providing a driving signal to the first piezoelectric element, a delay circuit for delaying the phase of the driving signal by 90 degrees, and a phase control circuit for comparing the phase of the output signal of the second piezoelectric element and the phase of the output signal of the delay circuit and controlling the phase of the driving signal such that the phase difference between these signals is eliminated. Therefore, even with a temperature change, the mass portion can be vibrated at a resonance frequency, so that the angular velocity can be detected with high accuracy.

The synchronous detection circuit according to the present invention can increase the efficiency of detecting the angular velocity signal component included in the sensor signal and can improve the signal removing effect for the driving signal component, thereby outputting a detection output in accordance with the actual magnitude of the angular velocity signal component. In addition, this synchronous detection circuit can be used to provide an angular velocity sensor with high detection efficiency.

BRIEF DESCRIPTION OF DRAWINGS

FIG. 1 is a diagram showing a structure of a main unit of an angular velocity sensor according to a first embodiment of the present invention.

FIG. 15 is a time chart for explaining the effects of the present invention.

FIG. 17 is a diagram showing a structure of a main unit of an angular velocity sensor according to a second embodiment of the present invention.

DESCRIPTION OF EMBODIMENTS

First Embodiment

Figure 2:
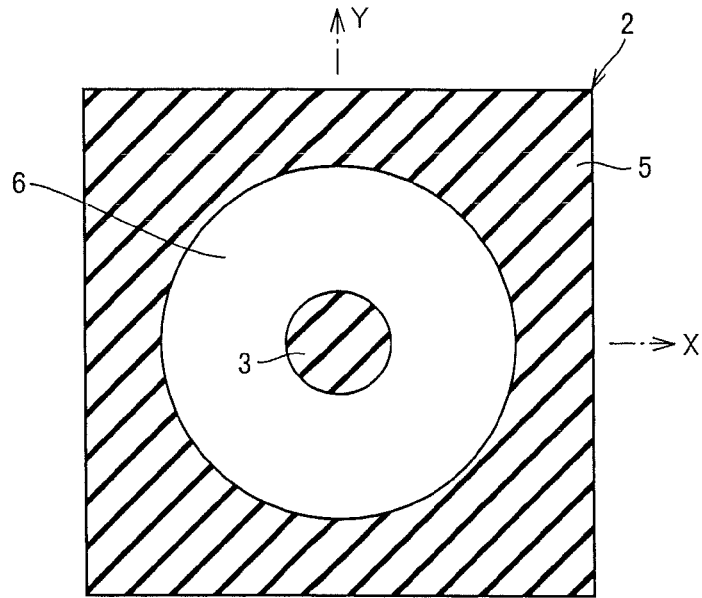
FIG. 2 is a cross-sectional view along line II-II in FIG. 1(b).

FIG. 1(a) is a plan view showing a structure of a main unit 1 of an angular velocity sensor in the first embodiment, and FIG. 1(b) is a sectional view of main unit 1 in FIG. 1(a) taken along the XZ plane. FIG. 2 is a cross-sectional view along line II-II in FIG. 1(b), and FIG. 3 is a cross-sectional view along line III-III in FIG. 1(b).

In FIGS. 1(a) and 1(b) to FIG. 3, main unit 1 includes a square-shaped main substrate 2. An auxiliary substrate 7 is provided under main substrate 2, and a support substrate 10 is provided under auxiliary substrate 7. For example, main substrate 2 is a silicon substrate, auxiliary substrate 7 is a glass substrate, and support substrate 10 is a silicon substrate.

As shown in FIG. 2, an annular groove 6 is formed in the back surface of main substrate 2. Main substrate 2 includes a cylindrical portion 3 on the inner side from groove 6, an annular flexible portion 4 serving as the bottom of groove 6, and a support portion 5 on the outer side from groove 6. Flexible portion 4 has flexibility since the thickness of flexible portion 4 is small. Groove 6 may be formed in the shape of a polygon.

Figure 3:
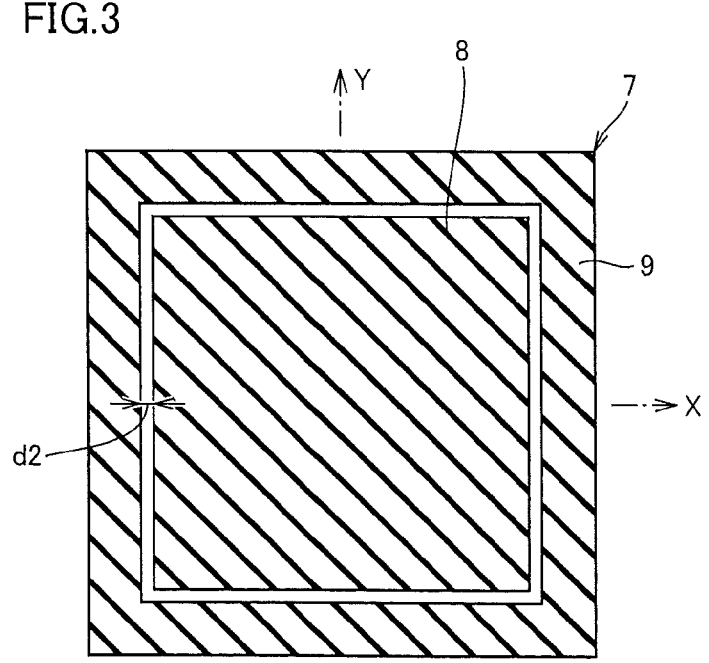
FIG. 3 is a cross-sectional view along line III-III in FIG. 1(b).

Auxiliary substrate 7 includes a mass portion 8 shaped like a prism having a square cross section, and a frame portion 9 in a square shape for accommodating mass portion 8, as shown in FIG. 3. As shown in FIG. 1(b), a cylindrical protrusion portion 8a is provided on the upper surface of mass portion 8. Protrusion portion 8a has a prescribed thickness d1 and has a diameter equal to the diameter of cylindrical portion 3. The upper end surface of protrusion portion 8a is fixed to the lower end surface of cylindrical portion 3. The upper end surface of frame portion 9 is fixed to the lower end surface of support portion 5, and the lower end surface of frame portion 9 is fixed to the upper end surface of support substrate 10.

As shown in FIG. 1(b), a prescribed distance d1 is secured between the upper surface of mass portion 8 and the lower end surface of support portion 5. A prescribed distance d2 is secured between the side surface of mass portion 8 and the inner surface of frame portion 9. A prescribed distance d3 is secured between the lower surface of mass portion 8 and the upper surface of support substrate 10. Therefore, in a state in which no force acts on the angular velocity sensor, mass portion 8 is suspended from above with cylindrical portion 3 interposed.

As shown in FIGS. 1(a) and 1(b), eight piezoelectric elements D1 to D4 and E1 to E4 each formed in the shape of a sector are fixed on the upper surface of flexible portion 4.

Here, for the sake of convenience of explanation, an XYZ three-dimensional orthogonal coordinate system is defined where an origin O is located at the center of the upper surface of main substrate 2, the X axis is taken in the rightward direction in FIG. 1(*a*), the Y axis is taken in the upward direction, and the Z axis is taken upward vertically to the sheet of the drawing.

Piezoelectric elements D1 to D4 are arranged in a circle along the inner edge of flexible portion 4, and piezoelectric elements E1 to E4 are arranged in a circle along the outer edge of flexible portion 4. Piezoelectric elements D1 and E1 are arranged on the positive side of the X axis, and piezoelectric elements D2 and E2 are arranged on the negative side of the X axis. Piezoelectric elements D3 and E3 are arranged on the positive side of the Y axis, and piezoelectric elements D4 and E4 are arranged on the negative side of the Y axis. Piezoelectric elements D1 and E1 and piezoelectric elements D2 and E2 are arranged in line symmetry with respect to the Y axis, and piezoelectric elements D3 and E3 and piezoelectric elements D4 and E4 are arranged in line symmetry with respect to the X axis.

Figure 4:
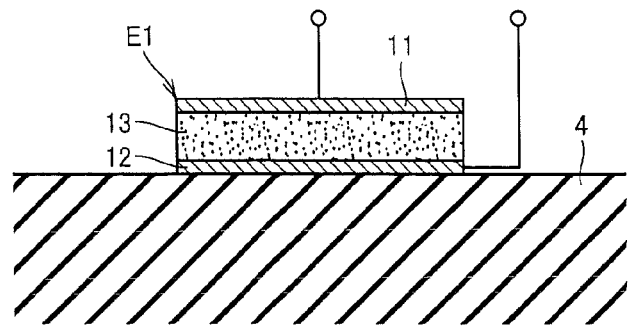
FIG. 4 is a cross-sectional view showing a structure of a piezoelectric element shown in FIG. 1.

As shown in FIG. 4, piezoelectric element E1 includes an upper electrode 11, a lower electrode 12, and a piezoelectric material layer 13. Lower electrode 12 is fixed to the front surface of flexible portion 4. Piezoelectric material layer 13 is formed, for example, of PZT (lead zirconate titanate). Other piezoelectric elements E2 to E4 and D1 to D4 each have the same structure as piezoelectric element E1.

When a first polarity voltage (for example, positive voltage) is applied between electrodes 11 and 12 of each of piezoelectric elements E1 and E2, each of piezoelectric elements E1 and E2 shrinks in the X-axis direction. When a second polarity voltage (for example, negative voltage) is applied between electrodes 11 and 12 of each of piezoelectric elements E1 and E2, each of piezoelectric elements E1 and E2 expands in the X-axis direction. When the first polarity voltage is applied between electrodes 11 and 12 of each of piezoelectric elements E3 and E4, each of piezoelectric elements E3 and E4 shrinks in the Y-axis direction. When the second polarity voltage is applied between electrodes 11 and 12 of each of piezoelectric elements E3 and E4, each of piezoelectric elements E3 and E4 expands in the Y-axis direction. The amount of expansion/shrinkage of each of piezoelectric elements E1 to E4 varies according to the voltage between electrodes 11 and 12 of each of piezoelectric elements E1 to E4. Flexible portion 4 is distorted upward when piezoelectric elements E1 to E4 shrink, and flexible portion 4 is distorted downward when piezoelectric elements E1 to E4 expand.

Figure 5:
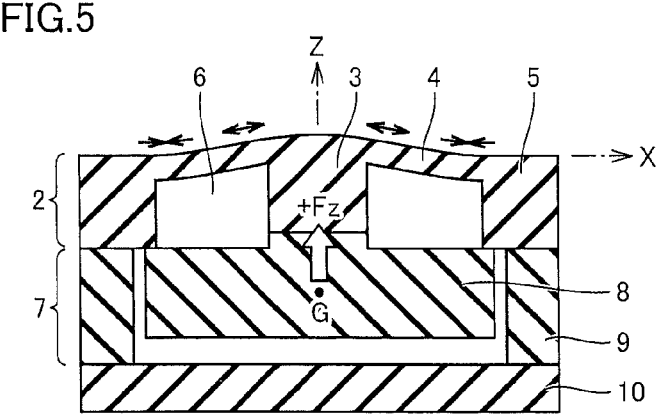
FIG. 5 is a cross-sectional view showing an operation of the main unit shown in FIG. 1.
Figure 6:
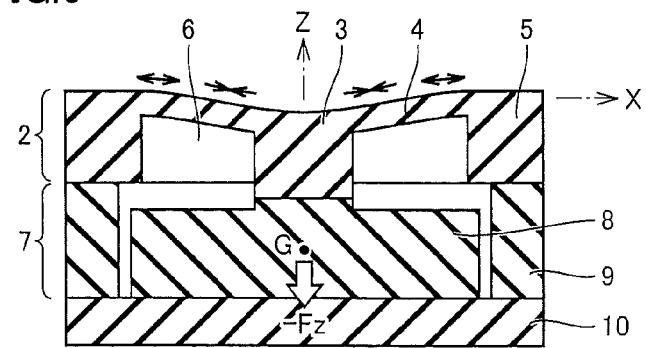
FIG. 6 is a cross-sectional view showing another operation of the main unit shown in FIG. 1.

Therefore, when the first polarity voltage is applied between electrodes 11 and 12 of each of piezoelectric elements E1 to E4, as shown in FIG. 5, each of piezoelectric elements E1 and E2 shrinks in the X-axis direction and each of piezoelectric elements E3 and E4 shrinks in the Y-axis direction, so that mass portion 8 moves upward (the positive direction of the Z axis). Conversely, when the second polarity voltage is applied between electrodes 11 and 12 of each of piezoelectric elements E1 to E4, as shown in FIG. 6, each of piezoelectric elements E1 and E2 expands in the X-axis direction and each of piezoelectric elements E3 and E4 expands in the Y-axis direction, so that mass portion 8 moves downward (the negative direction of the Z axis). Therefore, when AC voltage is applied between electrodes 11 and 12 of each of piezoelectric elements E1 to E4, each of piezoelectric elements E1 to E4 expands/shrinks, causing mass portion 8 to vibrate in the up/down direction (the Z-axis direction).

Furthermore, when each of piezoelectric elements D1 and D2 is shrunken in the X-axis direction, first polarity charge (for example, positive charge) and second polarity charge (for example, negative charge) are generated at electrodes 11 and 12, respectively, of each of piezoelectric elements D1 and D2. When each of piezoelectric elements D1 and D2 is expanded in the X-axis direction, second polarity charge and first polarity charge are generated at electrodes 11 and 12, respectively, of each of piezoelectric elements D1 and D2. Similarly, when each of piezoelectric elements D3 and D4 is shrunken in the Y-axis direction, first polarity charge and second polarity charge are generated at electrodes 11 and 12, respectively, of each of piezoelectric elements D3 and D4. When each of piezoelectric elements D3 and D4 is expanded in the Y-axis direction, second polarity charge and first polarity charge are generated at electrodes 11 and 12, respectively, of each of piezoelectric elements D3 and D4. The quantities of charge generated at electrodes 11 and 12 of each of piezoelectric elements D1 to D4, that is, the voltage between electrodes 11 and 12 of each of piezoelectric elements D1 to D4 changes according to the amount of expansion/shrinkage of each of piezoelectric elements D1 to D4. Piezoelectric elements D1 to D4 expand when flexible portion 4 is distorted upward, and piezoelectric elements D1 to D4 shrink when flexible portion 4 is distorted downward.

Therefore, as shown in FIG. 5, when mass portion 8 moves upward (the positive direction of the Z axis) to cause each of piezoelectric elements D1 and D2 to expand in the X-axis direction and each of piezoelectric elements D3 and D4 to expand in the Y-axis direction, second polarity charge and first polarity charge are generated at electrodes 11 and 12, respectively, of each of piezoelectric elements D1 to D4. Conversely, as shown in FIG. 6, when mass portion 8 moves downward (the negative direction of the Z axis) to cause each of piezoelectric elements D1 and D2 to shrink in the X-axis direction and each of piezoelectric elements D3 and D4 to shrink in the Y-axis direction, first polarity charge and second polarity charge are generated at electrodes 11 and 12, respectively, of each of piezoelectric elements D1 to D4. Therefore, when mass portion 8 vibrates in the up/down direction (the Z-axis direction) to cause each of piezoelectric elements D1 to D4 to expand/shrink, AC voltage is generated between electrodes 11 and 12 of each of piezoelectric elements D1 to D4.

Figure 7:
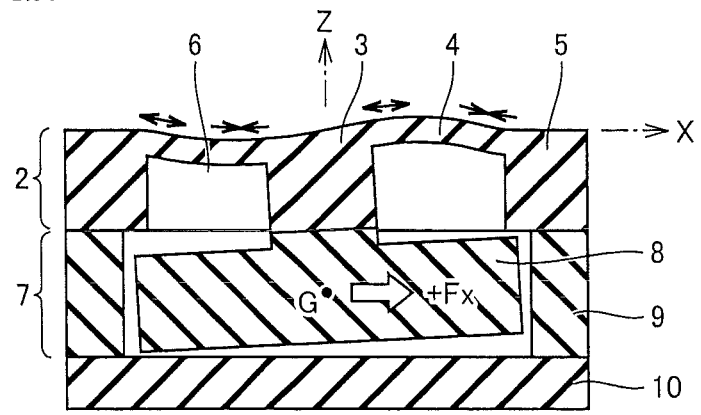
FIG. 7 is a cross-sectional view showing yet another operation of the main unit shown in FIG. 1.
Figure 8:
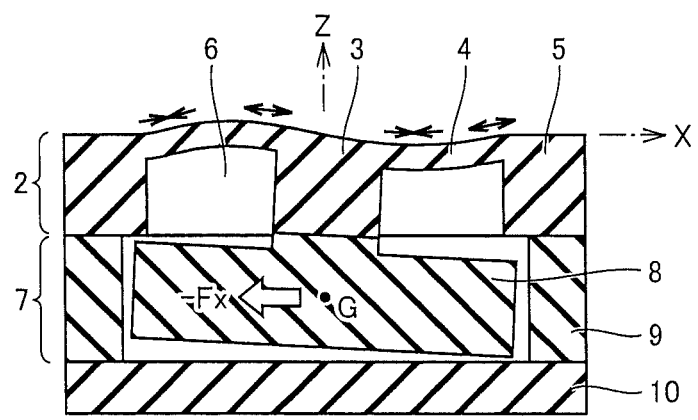
FIG. 8 is a cross-sectional view showing yet another operation of the main unit shown in FIG. 1.

Furthermore, as shown in FIG. 7, when a force +Fx in the rightward direction (the positive direction of the X axis) acts on the center of gravity G of mass portion 8, piezoelectric element D1 expands while piezoelectric element D2 shrinks. At this moment, second polarity charge and first polarity charge are generated at electrodes 11 and 12, respectively, of piezoelectric element D1, and first polarity charge and second polarity charge are generated at electrodes 11 and 12, respectively, of piezoelectric element D2. Conversely, as shown in FIG. 8, when a force −Fx in the leftward direction (the negative direction of the X axis) acts on the center of gravity G of mass portion 8, piezoelectric element D1 shrinks while piezoelectric element D2 expands. At this moment, first polarity charge and second polarity charge are generated at electrodes 11 and 12, respectively, of piezoelectric element D1, and second polarity charge and first polarity charge are generated at electrodes 11 and 12, respectively, of piezoelectric element D2.

Therefore, the quantities of charge generated at electrodes 11 and 12 of piezoelectric element D1 are converted into voltage V1, and the quantities of charge generated at electrodes 11 and 12 of piezoelectric element D2 are converted into voltage V2. Voltage V3 which is the difference between V1 and V2 is then found. Then, the polarity and magnitude of the force Fx in the X-axis direction acting on the center of gravity G of mass portion 8 can be found from V3.

Similarly, the quantities of charge generated at electrodes 11 and 12 of piezoelectric element D3 are converted into voltage V1, and the quantities of charge generated at electrodes 11 and 12 of piezoelectric element D4 are converted into voltage V2. Voltage V3 which is the difference between V1 and V2 is then found. Then, the polarity and magnitude of the force Fy in the Y-axis direction acting on the center of gravity G of mass portion 8 can be detected.

Now, assuming that an angular velocity ω around a second coordinate axis acts on an object which is moving at a velocity v in a first coordinate axis direction of a three-dimensional orthogonal coordinate system, Coriolis force Fc acts on the object in a third coordinate axis direction, and the angular velocity ω has a value proportional to Fc/v.

Therefore, if the force (Coriolis force) Fc in the X-axis direction acting on mass portion 8 is detected with mass portion 8 set in simple harmonic motion in the Z-axis direction, the angular velocity ωy around the Y axis acting on mass portion 8 can be found based on the detected value. In this case, if it is determined, for example, that "detection of force Fc is performed at a timing of a moment when the center of gravity G of mass portion 8 passes through the central position of simple harmonic motion," then the velocity v in the Y-axis direction of mass portion 8 at the measurement timing is always constant (the maximum velocity of the simple harmonic motion), so that the detected value of the force Fc can be handled as it is as the quantity proportional to the angular velocity ωy. Similarly, if the force (Coriolis force) Fc in the Y-axis direction acting on mass portion 8 is detected with mass portion 8 set in simple harmonic motion in the Z-axis direction, the angular velocity ωx around the X axis acting on mass portion 8 can be found based on the detected value.

Figure 9:
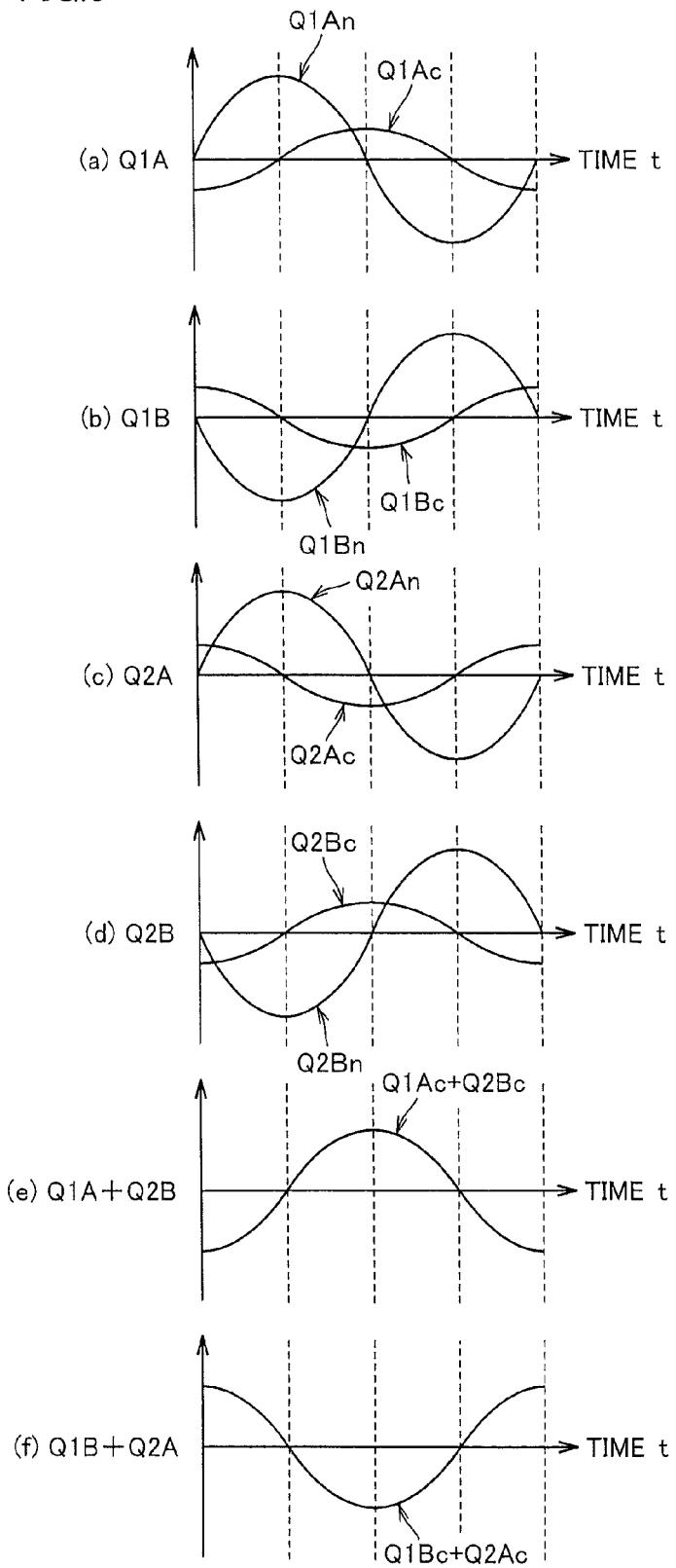
FIG. 9 is a time chart showing the changing quantities of charge generated at the piezoelectric elements D1, D2 shown in FIG. 1.

When the angular velocity ωy around the Y axis is applied to mass portion 8 with mass portion 8 set into simple harmonic motion in the Z-axis direction, the quantity of charge Q1A generated at electrode 11 of piezoelectric element D1 changes as shown in FIG. 9(a). The quantity of charge Q1A includes a vibration noise component Q1An generated by the vibration of mass portion 8 and a Coriolis component Q1Ac resulting from Coriolis force. Vibration noise component Q1An and Coriolis component Q1Ac both change sinusoidally in synchronization with vibration of mass portion 8. However, the waveform of Coriolis component Q1Ac lags in phase behind the waveform of vibration noise component Q1An by 90 degrees. When vibration noise component Q1An is zero, the velocity of mass portion 8 is greatest and Coriolis component Q1Ac is greatest.

Charges of opposite polarities are generated at electrodes 11 and 12 of piezoelectric element D1. Therefore, as shown in FIG. 9(b), vibration noise component Q1Bn and Coriolis component Q1Bc of the quantity of charge Q1B generated at electrode 12 of piezoelectric element D1 have phases opposite to vibration noise component Q1An and Coriolis component Q1Ac, respectively, of the quantity of charge Q1A generated at electrode 11 of piezoelectric element D1.

Furthermore, as shown in FIG. 5 and FIG. 6, piezoelectric elements D1 and D2 expand/shrink in the same direction with respect to the vibration in the Z-axis direction of mass portion 8. Therefore, vibration noise component Q2An of the quantity of charge Q2A generated at electrode 11 of piezoelectric element D2 has the same phase as vibration noise component Q1An of the quantity of charge Q1A generated at electrode 11 of piezoelectric element D1, as shown in FIG. 9(c). Vibration noise component Q2Bn of the quantity of charge Q2B generated at electrode 12 of piezoelectric element D2 has the same phase as vibration noise component Q1Bn of the quantity of charge Q1B generated at electrode 12 of piezoelectric element D1, as shown in FIG. 9(d).

As shown in FIG. 7 and FIG. 8, piezoelectric element D2 shrinks when a force in the positive direction of the X axis acts on mass portion 8 to cause piezoelectric element D1 to expand. Conversely, piezoelectric element D2 expands when a force in the negative direction of the X axis acts on mass portion 8 to cause piezoelectric element D1 to shrink. Therefore, Coriolis component Q2Ac of the quantity of charge Q2A generated at electrode 11 of piezoelectric element D2 has the opposite phase to Coriolis component Q1Ac of the quantity of charge Q1A generated at electrode 11 of piezoelectric element D1, as shown in FIG. 9(c). Coriolis component Q2Bc of the quantity of charge Q2B generated at electrode 12 of piezoelectric element D2 has the opposite phase to Coriolis component Q1Bc of the quantity of charge Q1B generated at electrode 12 of piezoelectric element D1, as shown in FIG. 9(d).

Therefore, if electrode 11 of piezoelectric element D1 and electrode 12 of piezoelectric element D2 are connected to combine the quantities of charge Q1A and Q2B, as shown in FIG. 9(e), vibration noise components Q1An and Q2Bn are cancelled out while Coriolis components Q1Ac and Q2Bc are added up. Similarly, if electrode 12 of piezoelectric element D1 and electrode 11 of piezoelectric element D2 are connected to combine the quantities of charge Q1B and Q2A, as shown in FIG. 9(f), vibration noise components Q1Bn and Q2An are cancelled out while Coriolis components Q1Bc and Q2Ac are added up.

Figure 10:
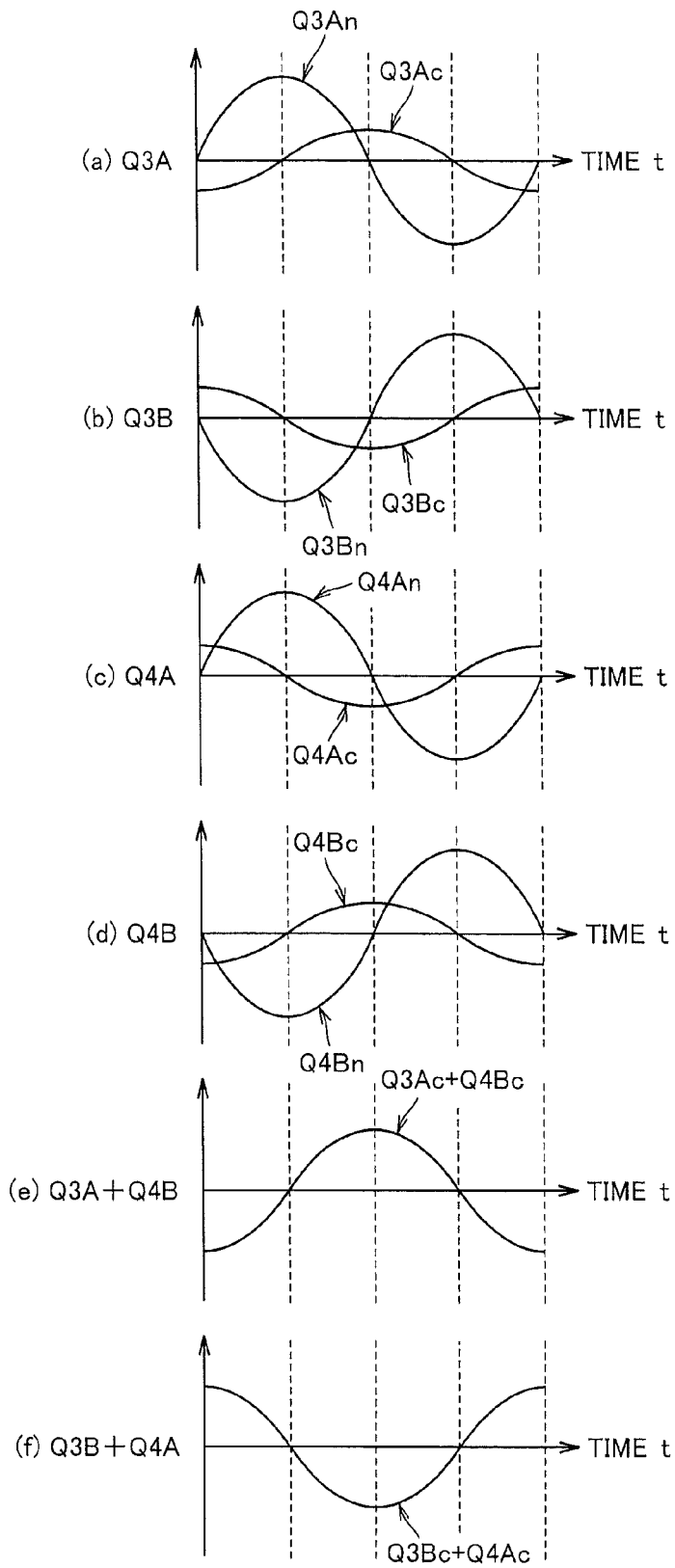
FIG. 10 is a time chart showing the changing quantities of charge generated at the piezoelectric elements D3, D4 shown in FIG. 1.

Similarly, when the angular velocity ωx around the X axis is applied to mass portion 8 with mass portion 8 set into simple harmonic motion in the Z-axis direction, the quantity of charge Q3A generated at electrode 11 of piezoelectric element D3 changes as shown in FIG. 10(a). The quantity of charge Q3A includes a vibration noise component Q3An generated by the vibration of mass portion 8 and a Coriolis component Q3Ac resulting from Coriolis force. Vibration noise component Q3An and Coriolis component Q3Ac both change sinusoidally in synchronization with vibration of mass portion 8. However, the waveform of Coriolis component Q3Ac lags in phase behind the waveform of vibration noise component Q3An by 90 degrees. When vibration noise component Q3An is zero, the velocity of mass portion 8 is greatest and Coriolis component Q3Ac is greatest.

Charges of opposite polarities are generated at electrodes 11 and 12 of piezoelectric element D3. Therefore, as shown in FIG. 10(b), vibration noise component Q3Bn and Coriolis component Q3Bc of the quantity of charge Q3B generated at electrode 12 of piezoelectric element D3 have phases opposite to vibration noise component Q3An and Coriolis component Q3Ac, respectively, of the quantity of charge Q3A generated at electrode 11 of piezoelectric element D3.

Furthermore, as shown in FIG. 5 and FIG. 6, piezoelectric elements D3 and D4 expand/shrink in the same direction with respect to the vibration in the Z-axis direction of mass portion 8. Therefore, vibration noise component Q4An of the quantity of charge Q4A generated at electrode 11 of piezoelectric element D4 has the same phase as vibration noise component Q3An of the quantity of charge Q3A generated at electrode 11 of piezoelectric element D3, as shown in FIG. 10(c). Vibration noise component Q4Bn of the quantity of charge Q4B generated at electrode 12 of piezoelectric element D4 has the same phase as vibration noise component Q3Bn of the quantity of charge Q3B generated at electrode 12 of piezoelectric element D3, as shown in FIG. 10(d).

As shown in FIG. 7 and FIG. 8, piezoelectric element D4 shrinks when a force in the positive direction of the Y axis acts on mass portion 8 to cause piezoelectric element D3 to expand. Conversely, piezoelectric element D4 expands when a force in the negative direction of the Y axis acts on mass portion 8 to cause piezoelectric element D3 to shrink. Therefore, Coriolis component Q4Ac of the quantity of charge Q4A generated at electrode 11 of piezoelectric element D4 has the opposite phase to Coriolis component Q3Ac of the quantity of charge Q3A generated at electrode 11 of piezoelectric element D3, as shown in FIG. 10(c). Coriolis component Q4Bc of the quantity of charge Q4B generated at electrode 12 of piezoelectric element D4 has the opposite phase to Coriolis component Q3Bc of the quantity of charge Q3B generated at electrode 12 of piezoelectric element D3, as shown in FIG. 10(d).

Therefore, if electrode 11 of piezoelectric element D3 and electrode 12 of piezoelectric element D4 are connected to combine the quantities of charge Q3A and Q4B, as shown in FIG. 10(e), vibration noise components Q3An and Q4Bn are cancelled out while Coriolis components Q3Ac and Q4Bc are added up. Similarly, if electrode 12 of piezoelectric element D3 and electrode 11 of piezoelectric element D4 are connected to combine the quantities of charge Q3B and Q4A, as shown in FIG. 10(f), vibration noise components Q3Bn and Q4An are cancelled out while Coriolis components Q3Bc and Q4Ac are added up.

Figure 11:
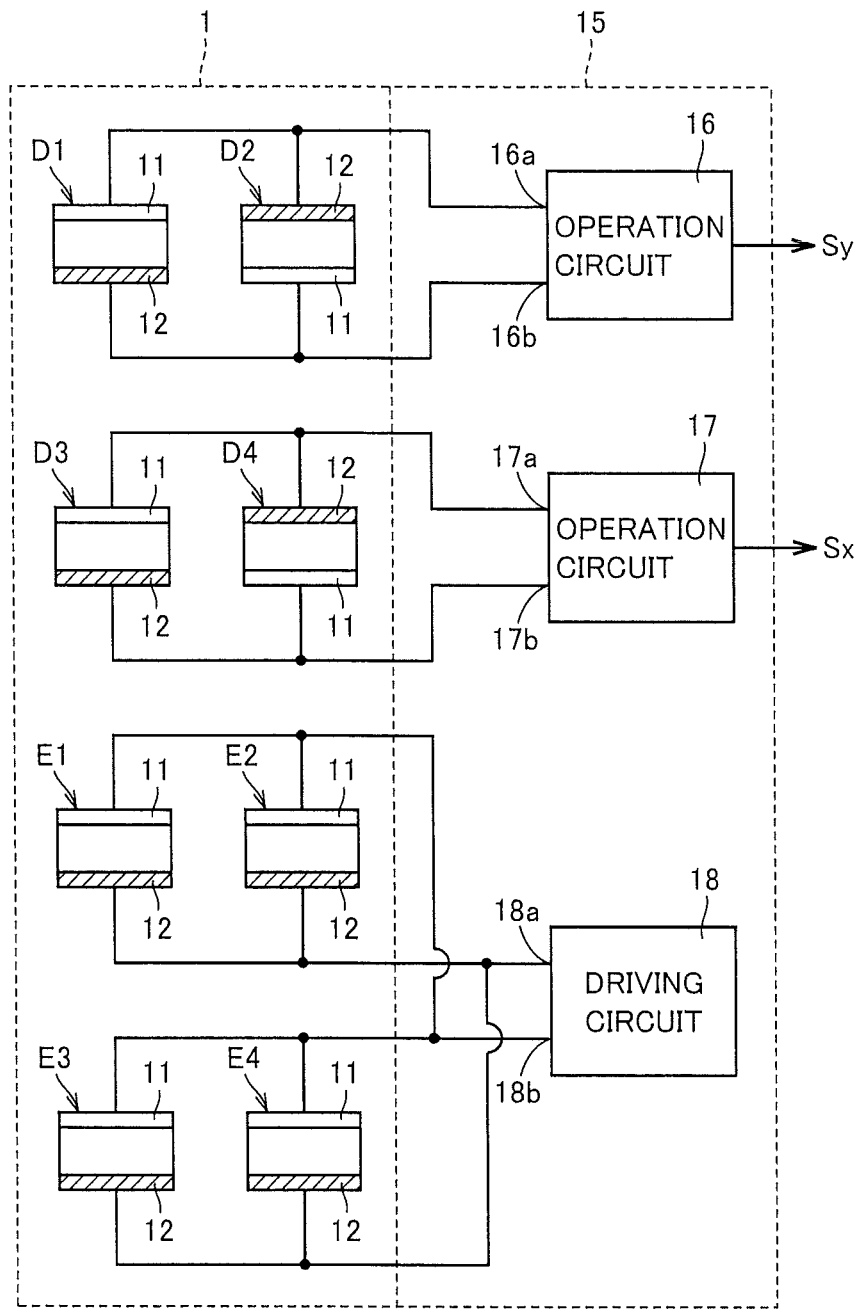
FIG. 11 is a block diagram showing an overall structure of the angular velocity sensor illustrated in FIG. 1 to FIG. 10.

FIG. 11 is a circuit block diagram showing a structure of the angular velocity sensor. In FIG. 11, this angular velocity sensor includes a main unit 1 and an electric circuit unit 15. Main unit 1 includes piezoelectric elements D1 to D4 and E1 to E4, and electric circuit unit 15 includes operation circuits 16 and 17 and a driving circuit 18.

Electrode 11 of piezoelectric element D1 and electrode 12 of piezoelectric element D2 are connected to one input terminal 16a of operation circuit 16. Electrode 12 of piezoelectric element D1 and electrode 11 of piezoelectric element D2 are connected to the other input terminal 16b of operation circuit 16. Operation circuit 16 finds the angular velocity ωy around the Y axis based on the Coriolis component (Q1Ac+Q2Bc) appearing at one input terminal 16a and the Coriolis component (Q1Bc+Q2Ac) appearing at the other input terminal 16b and outputs a signal Sy indicative of the angular velocity ωy.

Electrode 11 of piezoelectric element D3 and electrode 12 of piezoelectric element D4 are connected to one input terminal 17a of operation circuit 17. Electrode 12 of piezoelectric element D3 and electrode 11 of piezoelectric element D4 are connected to the other input terminal 17b of operation circuit 17. Operation circuit 17 finds the angular velocity ωx around the X axis based on the Coriolis component (Q3Ac+Q4Bc) appearing at one input terminal 17a and the Coriolis component (Q3Bc+Q4Ac) appearing at another input terminal 17b and outputs a signal Sx indicative of the angular velocity ωx.

Electrodes 11 of piezoelectric elements E1 to E4 are connected to one output terminal 18a of driving circuit 18, and electrodes 12 of piezoelectric elements E1 to E4 are connected to the other output terminal 18b of driving circuit 18. Driving circuit 18 applies AC voltage between output terminals 18a and 18b to expand/shrink each of piezoelectric elements E1 to E4 and to vibrate mass portion 8 in the Z-axis direction.

Figure 12:
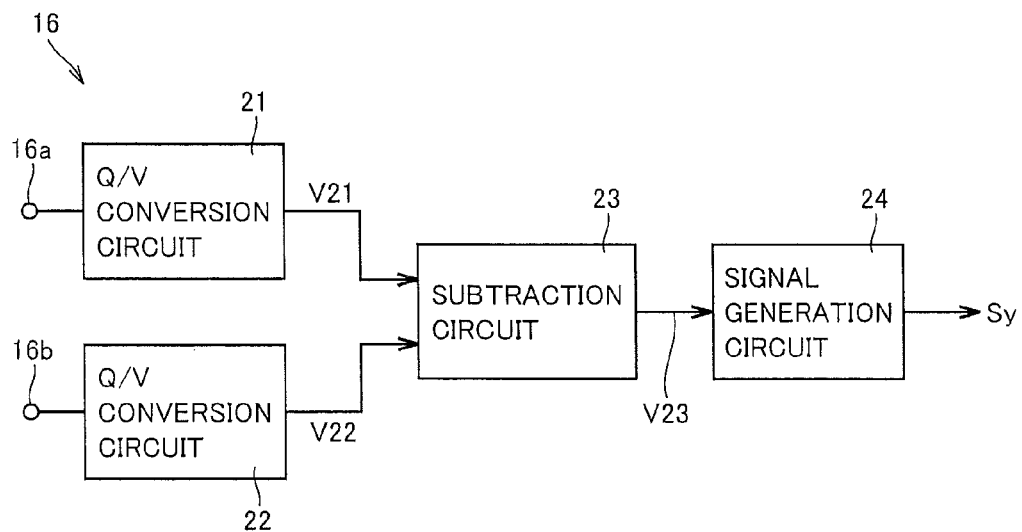
FIG. 12 is a block diagram showing a structure of an operation circuit shown in FIG. 11.

FIG. 12 is a block diagram showing a structure of operation circuit 16. In FIG. 12, operation circuit 16 includes Q/V conversion circuits 21 and 22, a subtraction circuit 23, and a signal generation circuit 24. Q/V conversion circuit 21 converts the Coriolis component (Q1Ac+Q2Bc) appearing at input terminal 16a into voltage V21. The waveform of voltage V21 is sinusoidal with the opposite phase to that of the Coriolis component (Q1Ac+Q2Bc). Q/V conversion circuit 22 converts the Coriolis component (Q1Bc+Q2Ac) appearing at input terminal 16b into voltage V22. The waveform of voltage V22 is sinusoidal with the opposite phase to that of the Coriolis component (Q1Bc+Q2Ac) and has the opposite phase to the waveform of voltage V21.

Subtraction circuit 23 subtracts voltage V21 from voltage V22 to generate voltage V23. Signal generation circuit 24 finds the angular velocity ωy around the Y axis based on voltage V23 to output signal Sy indicative of the angular velocity ωy. Operation circuit 17 has the same structure as operation circuit 16 and therefore a description thereof will not be repeated.

Figure 13:
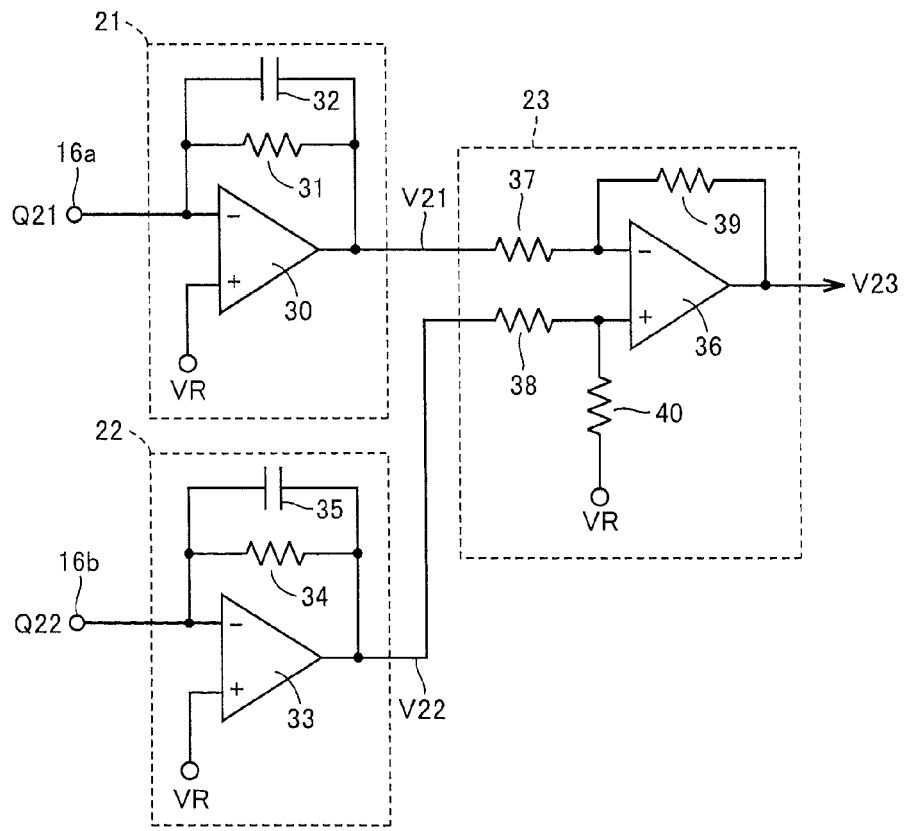
FIG. 13 is a circuit diagram illustrating a structure of Q/V conversion circuits and a subtraction circuit shown in FIG. 12.

FIG. 13 is a circuit diagram illustrating the structure of Q/V conversion circuits 21 and 22 and subtraction circuit 23 shown in FIG. 12. In FIG. 13, Q/V conversion circuit 21 includes an operation amplifier 30, a resistor element 31, and a capacitor 32. Operation amplifier 30 has an inversion input terminal (−terminal) connected to input terminal 16a and a non-inversion input terminal (+terminal) receiving reference voltage VR. Resistor element 31 is connected between the inversion input terminal and the output terminal of operation amplifier 30. Capacitor 32 is connected in parallel with resistor element 31.

Let the quantity of charge appearing at input terminal 16a be Q21 and the capacitance value of capacitor 32 be C1, output voltage V21 of Q/V conversion circuit 21 is written as V21=−Q21/C1. Therefore, the Q/V conversion efficiency can be adjusted by adjusting the capacitance value C1 of capacitor 32.

Q/V conversion circuit 22 includes an operation amplifier 33, a resistor element 34, and a capacitor 35. Operation amplifier 33 has an inversion input terminal connected to input terminal 16b and a non-inversion input terminal receiving reference voltage VR. Resistor element 34 is connected between the inversion input terminal and the output terminal of operation amplifier 33. Capacitor 35 is connected in parallel with resistor element 34.

Let the quantity of charge appearing at input terminal 16b be Q22 and the capacitance value of capacitor 35 be C2, output voltage V22 of Q/V conversion circuit 22 is written as V22=−Q22/C2. Therefore, the Q/V conversion efficiency can be adjusted by adjusting the capacitance value C2 of capacitor 35.

Subtraction circuit 23 includes an operation amplifier 36 and resistor elements 37 to 40. Resistor element 37 has one electrode receiving output voltage V21 of Q/V conversion circuit 21 and the other electrode connected to the inversion input terminal of operation amplifier 36. Resistor element 38 has one electrode receiving output voltage V22 of Q/V conversion circuit 22 and the other electrode connected to the non-inversion input terminal of operation amplifier 36. Resistor element 39 is connected between the inversion input terminal and the output terminal of operation amplifier 36. Resistor element 40 has one electrode connected to the non-inversion input terminal of operation amplifier 36 and the other electrode receiving reference voltage VR.

Let the resistance value of each of resistor elements 37 and 38 be R1 and the resistance value of each of resistor elements 39 and 40 be R2, output voltage V23 of subtraction circuit 23 is written as V23=(V22−V21)R2/R1. Therefore, the amplification rate of subtraction circuit 23 can be adjusted by adjusting resistance values R1 and R2.

Figure 14:
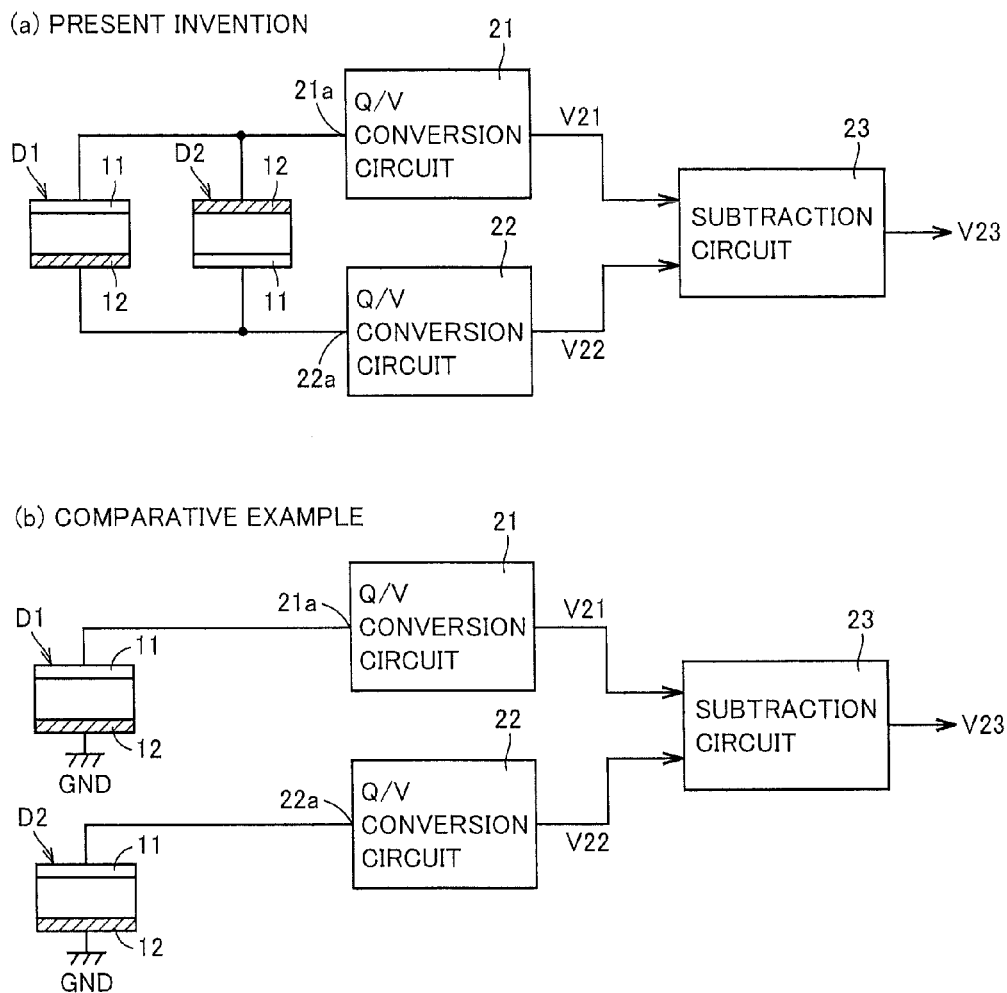
FIG. 14 is a block diagram for explaining the effects of the present invention.

FIGS. 14(a) and 14(b) are diagrams for explaining the effects of the angular velocity sensor of this application. Specifically, FIG. 14(a) is a block diagram showing a main part of the angular velocity sensor of this application, and FIG. 14(b) is a block diagram showing a main part of a comparative example.

In the present invention, as shown in FIG. 14(a), electrode 11 of piezoelectric element D1 and electrode 12 of piezoelectric element D2 are connected to input terminal 21a of Q/V conversion circuit 21, and electrode 12 of piezoelectric element D1 and electrode 11 of piezoelectric element D2 are connected to input terminal 22a of Q/V conversion circuit 22. Accordingly, as shown in FIGS. 9(a) to 9(f), the vibration noise components of the charges generated at piezoelectric elements D1 and D2 are cancelled out, and only the Coriolis component appears at each of input terminals 21a and 22a. Q/V conversion circuit 21 converts the Coriolis component appearing at input terminal 21a into voltage V21, and Q/V conversion circuit 22 converts the Coriolis component appearing at input terminal 22a into voltage V22. Subtraction circuit 23 subtracts voltage V21 from voltage V22 to generate voltage V23.

On the other hand, in the comparative example, as shown in FIG. 14(b), electrode 11 of piezoelectric element D1 is connected to input terminal 21a of Q/V conversion circuit 21, and electrode 11 of piezoelectric element D2 is connected to input terminal 22a of Q/V conversion circuit 22. Electrodes 12 of piezoelectric elements D1 and D2 are both grounded. Q/V conversion circuit 21 converts both the vibration noise component and the Coriolis component of the charge appearing at input terminal 21a into voltage V21, and Q/V conversion circuit 22 converts both the vibration noise component and the Coriolis component of the charge appearing at input terminal 22a into voltage V22. Subtraction circuit 23 subtracts voltage V21 from voltage V22 to generate voltage V23.

FIG. 15(a) is a time chart showing output voltage V21 of Q/V conversion circuit 21 shown in FIG. 14(a), and FIG. 15(b) is a time chart showing output voltage V21 of Q/V conversion circuit 21 shown in FIG. 14(b). In the present invention, output voltage V21 of Q/V conversion circuit 21 includes only the Coriolis component V21c. Therefore, the Q/V conversion efficiency can be set high in such an extent that the output voltage of Q/V conversion circuit 21 does not exceed saturation voltages VOH, VOL to yield a large Coriolis signal V21c. Therefore, the angular velocity can be detected accurately.

By contrast, in the comparative example, output voltage V21 of Q/V conversion circuit 21 includes both vibration noise component V21n and Coriolis component V21c. Therefore, even if the Q/V conversion efficiency is set high in such an extent that the output voltage of Q/V conversion circuit 21 does not exceed saturation voltages VOH, VOL, only a small Coriolis signal V21c is obtained because vibration noise component V21n is considerably larger than Coriolis component V21c. Therefore, the angular velocity cannot be detected accurately.

Figure 16:
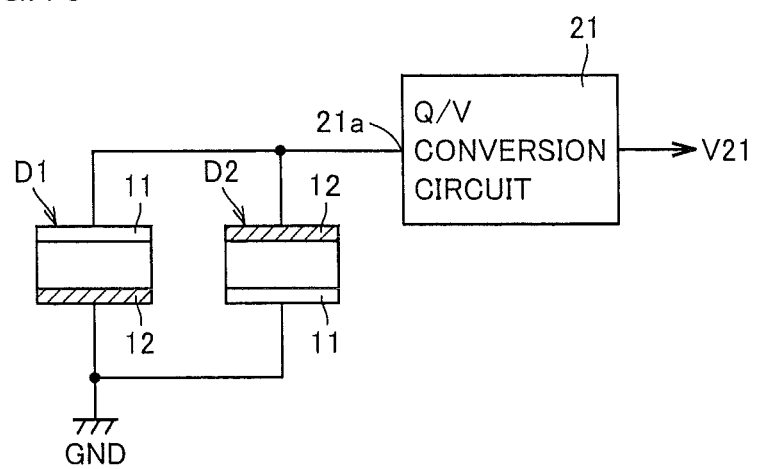
FIG. 16 is a block diagram showing a modification of the first embodiment.

FIG. 16 is a block diagram showing a modification of the first embodiment in contrast with FIG. 14(a). The angular velocity sensor in FIG. 16 differs from the angular velocity sensor in FIG. 14(a) in that electrode 12 of piezoelectric element D1 and electrode 11 of piezoelectric element D2 are grounded and in that Q/V conversion circuit 22 and subtraction circuit 23 are eliminated. Output voltage V21 of Q/V conversion circuit 21 includes only Coriolis component V21c as shown in FIG. 15(a). Output voltage V21 of Q/V conversion circuit 21 is directly input to signal generation circuit 24 in FIG. 12. Signal generation circuit 24 finds the angular velocity ωy around the Y axis based on voltage V21 and outputs signal Sy indicative of the angular velocity ωy. The other configuration and operation is the same as that of the first embodiment and therefore a description thereof will not be repeated.

In this modification, the elimination of Q/V conversion circuit 22 and subtraction circuit 23 reduces the size of the device. However, although the circuitry in FIG. 12 subtracts voltage V21 from voltage V22 thereby removing the in-phase noise of voltages V21 and V22, this modification cannot remove noise occurring in voltage V21.

Second Embodiment

FIG. 17(a) is a plan view showing a structure of a main unit 41 of an angular velocity sensor in a second embodiment, in contrast with FIG. 1(a). FIG. 17(b) is a view showing main unit 41 in FIG. 17(a) cut along the XZ plane, in contrast with FIG. 1(b).

Referring to FIGS. 17(a) and 17(b), main unit 41 differs from main unit 1 in the first embodiment in that piezoelectric elements E1 to E4 are replaced by piezoelectric elements E11 to E18 and F1 to F4. Each of piezoelectric elements E11 to E18 and F1 to F4 is formed in the shape of a section and is fixed to the upper surface of flexible portion 4. Piezoelectric elements D1 to D4 are provided to detect the Coriolis force acting on mass portion 8. Piezoelectric elements E11 to E18 are provided to vibrate mass portion 8. Piezoelectric elements F1 to F4 are provided to detect the vibration of mass portion 8. Here, for the sake of convenience of explanation, an XYZ three-dimensional orthogonal coordinate system is defined where origin O is located at the center of the upper surface of main substrate 2, the X axis is taken in the rightward direction in FIG. 17(a), the Y axis is taken in the upward direction, and the Z axis is taken upward vertically to the sheet of the drawing.

Piezoelectric elements D1 to D4 are arranged in a circle along the inner edge of flexible portion 4, and piezoelectric elements E11 to E18 and F1 to F4 are arranged in a circle along the outer edge of flexible portion 4. Piezoelectric elements D1 and F1 are arranged on the positive side of the X axis, and piezoelectric elements D2 and F2 are arranged on the negative side of the X axis. Piezoelectric elements D3 and F3 are arranged on the positive side of the Y axis, and piezoelectric elements D4 and F4 are arranged on the negative side of the Y axis. Piezoelectric elements D1 and F1 and piezoelectric elements D2 and F2 are arranged in line symmetry with respect to the Y axis, and piezoelectric elements D3 and F3 and piezoelectric elements D4 and F4 are arranged in line symmetry with respect to the X axis.

Piezoelectric elements E11 and E12 are arranged on the opposite sides of piezoelectric element F1. Piezoelectric elements E13 and E14 are arranged on the opposite sides of piezoelectric element F2. Piezoelectric elements E15 and E16 are arranged on the opposite sides of piezoelectric element F3. Piezoelectric elements E17 and E18 are arranged on the opposite sides of piezoelectric element F4. Each of piezoelectric elements E11 to E18 and F1 to F4 has the same structure as piezoelectric element E1 shown in FIG. 4.

When a first polarity voltage (for example, positive voltage) is applied between electrodes 11 and 12 of each of piezoelectric elements E11 to E14, each of piezoelectric elements E11 to E14 shrinks in the X-axis direction. When a second polarity voltage (for example, negative voltage) is applied between electrodes 11 and 12 of each of piezoelectric elements E11 to E14, each of piezoelectric elements E11 to E14 expands in the X-axis direction. When the first polarity voltage is applied between electrodes 11 and 12 of each of piezoelectric elements E15 to E18, each of piezoelectric elements E15 to E18 shrinks in the Y-axis direction. When the second polarity voltage is applied between electrodes 11 and 12 of each of piezoelectric elements E15 to E18, each of piezoelectric elements E15 to E18 expands in the Y-axis direction. The amount of expansion/shrinkage of each of piezoelectric elements E11 to E18 varies according to the voltage between electrodes 11 and 12 of each of piezoelectric elements E11 to E18. Flexible portion 4 is distorted upward when piezoelectric elements E11 to E18 shrink, and flexible portion 4 is distorted downward when piezoelectric elements E11 to E18 expand.

Therefore, when the first polarity voltage is applied between electrodes 11 and 12 of each of piezoelectric elements E11 to E18, as shown in FIG. 5, each of piezoelectric elements E11 to E14 shrinks in the X-axis direction while each of piezoelectric elements E15 to E18 shrinks in the Y-axis direction, so that mass portion 8 moves upward (the positive direction of the Z axis). Conversely, when the second polarity voltage is applied between electrodes 11 and 12 of each of piezoelectric elements E11 to E18, as shown in FIG. 6, each of piezoelectric elements E11 to E14 expands in the X-axis direction while each of piezoelectric elements E15 to E18 expands in the Y-axis direction, so that mass portion 8 moves downward (the negative direction of the Z axis). Therefore, when AC voltage is applied between electrodes 11 and 12 of each of piezoelectric elements E11 to E18, each of piezoelectric elements E11 to E18 expands/shrinks, causing mass portion 8 to vibrate in the up/down direction (the Z-axis direction).

Furthermore, when each of piezoelectric elements D1, D2, F1, and F2 is shrunken in the X-axis direction, first polarity charge (for example, positive charge) and second polarity charge (for example, negative charge) are generated at electrodes 11 and 12, respectively, of each of piezoelectric elements D1, D2, F1, and F2. When each of piezoelectric elements D1, D2, F1, and F2 is expanded in the X-axis direction, second polarity charge and first polarity charge are generated at electrodes 11 and 12, respectively, of each of piezoelectric elements D1, D2, F1, and F2. Similarly, when each of piezoelectric elements D3, D4, F3, and F4 is shrunken in the Y-axis direction, first polarity charge and second polarity charge are generated at electrodes 11 and 12, respectively, of each of piezoelectric elements D3, D4, F3, and F4. When each of piezoelectric elements D3, D4, F3, and F4 is expanded in the Y-axis direction, second polarity charge and first polarity charge are generated at electrodes 11 and 12, respectively, of each of piezoelectric elements D3, D4, F3, and F4. The quantities of charge generated at electrodes 11 and 12 of each of piezoelectric elements D1 to D4 and F1 to F4, that is, the voltage between electrodes 11 and 12 of each of piezoelectric elements D1 to D4 and F1 to F4 changes according to the amount of expansion/shrinkage of each of piezoelectric elements D1 to D4 and F1 to F4.

Piezoelectric elements D1 to D4 expand while piezoelectric elements F1 to F4 shrink when flexible portion 4 is distorted upward. Piezoelectric elements D1 to D4 shrink and piezoelectric elements F1 to F4 expand when flexible portion 4 is distorted downward.

Therefore, as shown in FIG. 5, when mass portion 8 moves upward (the positive direction of the Z axis) to cause each of piezoelectric elements D1 and D2 to expand in the X-axis direction and each of piezoelectric elements D3 and D4 to expand in the Y-axis direction, second polarity charge and first polarity charge are generated at electrodes 11 and 12, respectively, of each of piezoelectric elements D1 to D4. When mass portion 8 moves upward to cause each of piezoelectric elements F1 and F2 to shrink in the X-axis direction and each of piezoelectric elements F3 and F4 to shrink in the Y-axis direction, first polarity charge and second polarity charge are generated at electrodes 11 and 12, respectively, of piezoelectric elements F1 to F4.

Conversely, as shown in FIG. 6, when mass portion 8 moves downward (the negative direction of the Z axis) to cause each of piezoelectric elements D1 and D2 to shrink in the X-axis direction and each of piezoelectric elements D3 and D4 to shrink in the Y-axis direction, first polarity charge and second polarity charge are generated at electrodes 11 and 12, respectively, of each of piezoelectric elements D1 to D4. On the other hand, when mass portion 8 moves downward to cause each of piezoelectric elements F1 and F2 to expand in the X-axis direction and each of piezoelectric elements F3 and F4 to expand in the Y-axis direction, second polarity charge and first polarity charge are generated at electrodes 11 and 12, respectively, of each of piezoelectric elements F1 to F4. Therefore, when mass portion 8 vibrates in the up/down direction (the Z-axis direction) to cause each of piezoelectric elements D1 to D4 and F1 to F4 to expand/shrink, AC voltage is generated between electrodes 11 and 12 of each of piezoelectric elements D1 to D4 and F1 to F4.

Furthermore, as shown in FIG. 7, when a force +Fx in the rightward direction (the positive direction of the X axis) acts on the center of gravity G of mass portion 8, piezoelectric element D1 expands while piezoelectric element D2 shrinks. At this moment, second polarity charge and first polarity charge are generated at electrodes 11 and 12, respectively, of piezoelectric element D1, and first polarity charge and second polarity charge are generated at electrodes 11 and 12, respectively, of piezoelectric element D2. Conversely, as shown in FIG. 8, when a force −Fx in the leftward direction (the negative direction of the X axis) acts on the center of gravity G of mass portion 8, piezoelectric element D1 shrinks while piezoelectric element D2 expands. At this moment, first polarity charge and second polarity charge are generated at electrodes 11 and 12, respectively, of piezoelectric element D1, and second polarity charge and first polarity charge are generated at electrodes 11 and 12, respectively, of piezoelectric element D2.

Therefore, the quantities of charge generated at electrodes 11 and 12 of piezoelectric element D1 are converted into voltage V1, and the quantities of charge generated at electrodes 11 and 12 of piezoelectric element D2 are converted into voltage V2. Voltage V3 which is the difference between V1 and V2 is then found. Then, the polarity and magnitude of the force Fx in the X-axis direction acting on the center of gravity G of mass portion 8 can be found from V3.

Similarly, the quantities of charge generated at electrodes 11 and 12 of piezoelectric element D3 are converted into voltage V1, and the quantities of charge generated at electrodes 11 and 12 of piezoelectric element D4 are converted into voltage V2. Voltage V3 which is the difference between V1 and V2 is then found. Then, the polarity and magnitude of the force Fy in the Y-axis direction acting on the center of gravity G of mass portion 8 can be detected.

Figure 18:
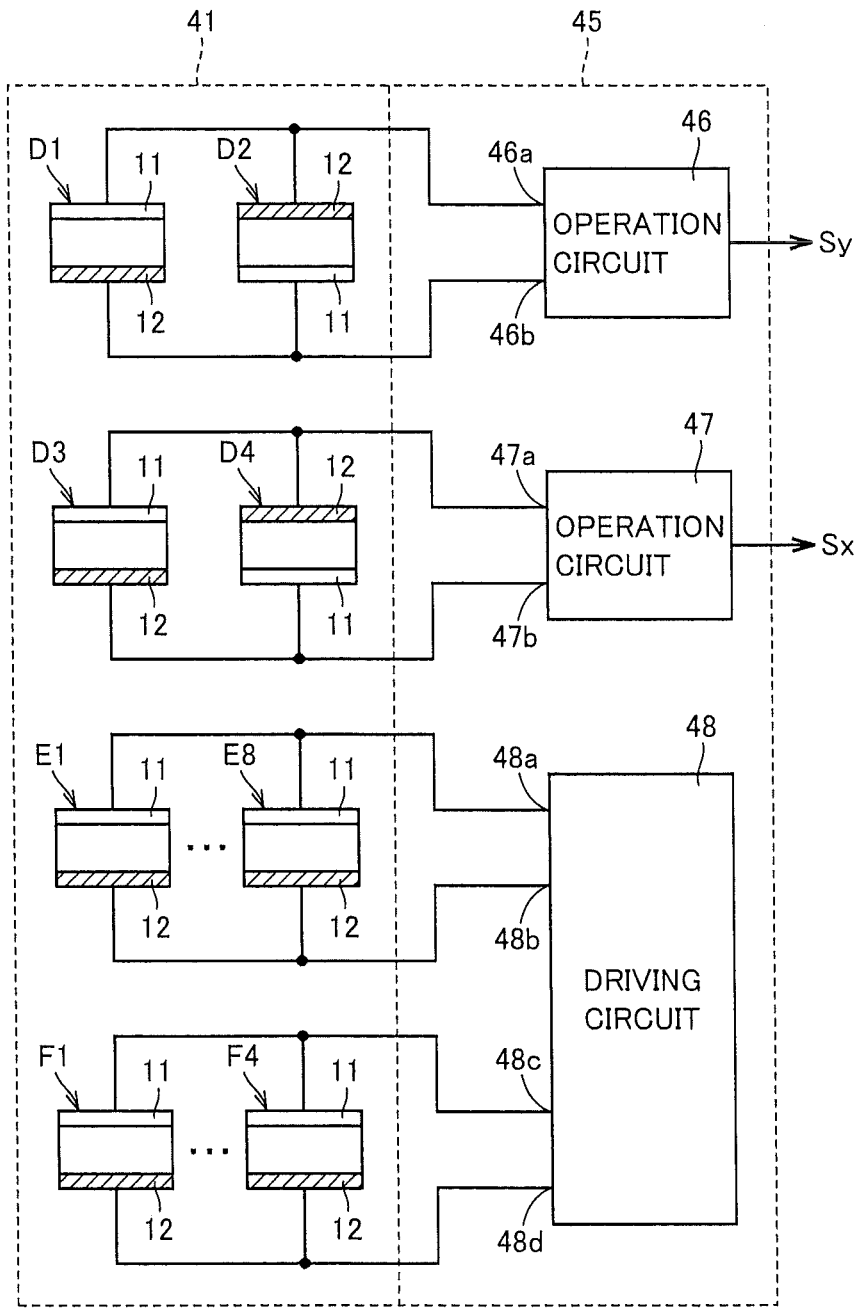
FIG. 18 is a block diagram showing an overall structure of the angular velocity sensor illustrated in FIG. 17.

FIG. 18 is a circuit block diagram showing a structure of the angular velocity sensor. In FIG. 18, this angular velocity sensor includes a main unit 41 and an electric circuit unit 45. Main unit 41 includes piezoelectric elements D1 to D4, E1 to E18, and F1 to F4, and electric circuit unit 45 includes operation circuits 46 and 47 and a driving circuit 48.

Electrode 11 of piezoelectric element D1 and electrode 12 of piezoelectric element D2 are connected to one input terminal 46a of operation circuit 46. Electrode 12 of piezoelectric element D1 and electrode 11 of piezoelectric element D2 are connected to the other input terminal 46b of operation circuit 46. Operation circuit 46 finds the angular velocity ωy around the Y axis based on the Coriolis component (Q1Ac+Q2Bc) appearing at one input terminal 46a and the Coriolis component (Q1Bc+Q2Ac) appearing at the other input terminal 46b and outputs a signal Sy indicative of the angular velocity ωy.

Electrode 11 of piezoelectric element D3 and electrode 12 of piezoelectric element D4 are connected to one input terminal 47a of operation circuit 47. Electrode 12 of piezoelectric element D3 and electrode 11 of piezoelectric element D4 are connected to the other input terminal 47b of operation circuit 47. Operation circuit 47 finds the angular velocity ωx around the X axis based on the Coriolis component (Q3Ac+Q4Bc) appearing at one input terminal 47a and the Coriolis component (Q3Bc+Q4Ac) appearing at the other input terminal 47b and outputs a signal Sx indicative of the angular velocity ωx.

Electrodes 11 of piezoelectric elements E11 to E18 are connected to an output terminal 48a of driving circuit 48, and electrodes 12 of piezoelectric elements E11 to E18 are connected to an output terminal 48b of driving circuit 48. Electrodes 11 of piezoelectric elements F1 to F4 are connected to an input terminal 48c of driving circuit 48, and electrodes 12 of piezoelectric elements F1 to F4 are connected to an input terminal 48d of driving circuit 48. Since electrodes 11 of piezoelectric elements F1 to F4 are connected with each other and electrodes 12 of piezoelectric elements F1 to F4 are connected with each other, the Coriolis components of the quantities of charge generated at electrodes 11 and 12 of piezoelectric elements F1 to F4 are cancelled out, and only the charges of vibration noise components are generated at electrodes 11 and 12 of piezoelectric elements F1 to F4. Driving circuit 48 applies AC voltage between output terminals 48a and 48b in synchronization with the vibration of mass portion 8 detected by piezoelectric elements F1 to F4 to expand/shrink each of piezoelectric elements E11 to E18 and to vibrate mass portion 8 in the Z-axis direction.

Figure 19:
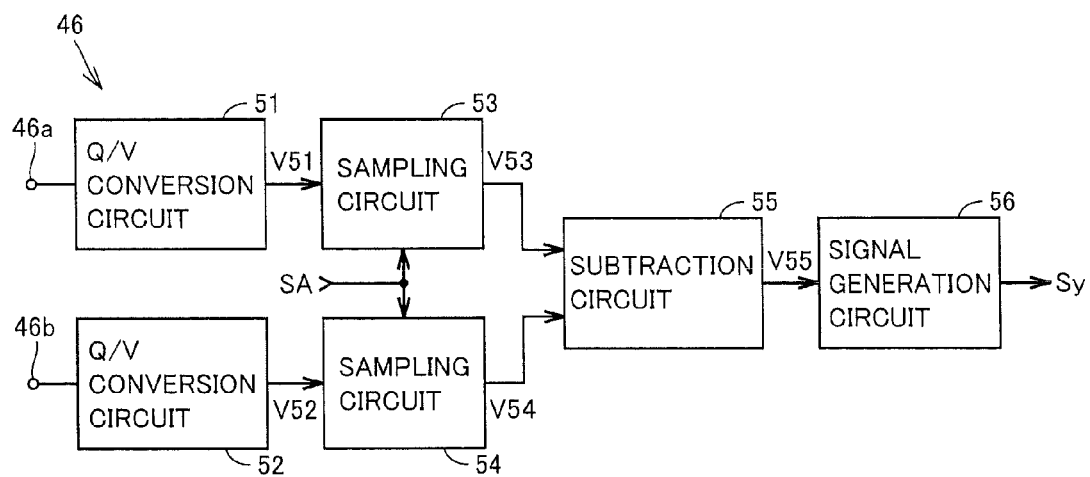
FIG. 19 is a block diagram showing a structure of an operation circuit shown in FIG. 18.

FIG. 19 is a block diagram showing a structure of operation circuit 46. In FIG. 19, operation circuit 46 includes Q/V conversion circuits 51 and 52, sampling circuits 53 and 54, a subtraction circuit 55, and a signal generation circuit 56. Q/V conversion circuit 51 converts the Coriolis component (Q1Ac+Q2Bc) appearing at input terminal 46a into voltage V51. The waveform of voltage V51 is sinusoidal with the opposite phase to that of the Coriolis component (Q1Ac+Q2Bc). Q/V conversion circuit 52 converts the Coriolis component (Q1Bc+Q2Ac) appearing at input terminal 46b into voltage V52. The waveform of voltage V52 is sinusoidal with the opposite phase to that of the Coriolis component (Q1Bc+Q2Ac) and has the opposite phase to the waveform of voltage V51.

Sampling circuit 53 samples the peak value of output voltage V51 of Q/V conversion circuit 51 in response to a sampling pulse SA and provides voltage V53 at a level corresponding to the sampled peak value to subtraction circuit 55. Sampling circuit 54 samples the peak value of output voltage V52 of Q/V conversion circuit 52 in response to sampling pulse SA and provides voltage V54 at a level corresponding to the sampled peak value to subtraction circuit 55.

Subtraction circuit 55 subtracts voltage V54 from voltage V53 to generate voltage V55. Signal generation circuit 56 finds the angular velocity ωy around the Y axis based on voltage V55 to output signal Sy indicative of the angular velocity ωy. Operation circuit 47 has the same structure as operation circuit 46 and therefore a description thereof will not be repeated.

Figure 20:
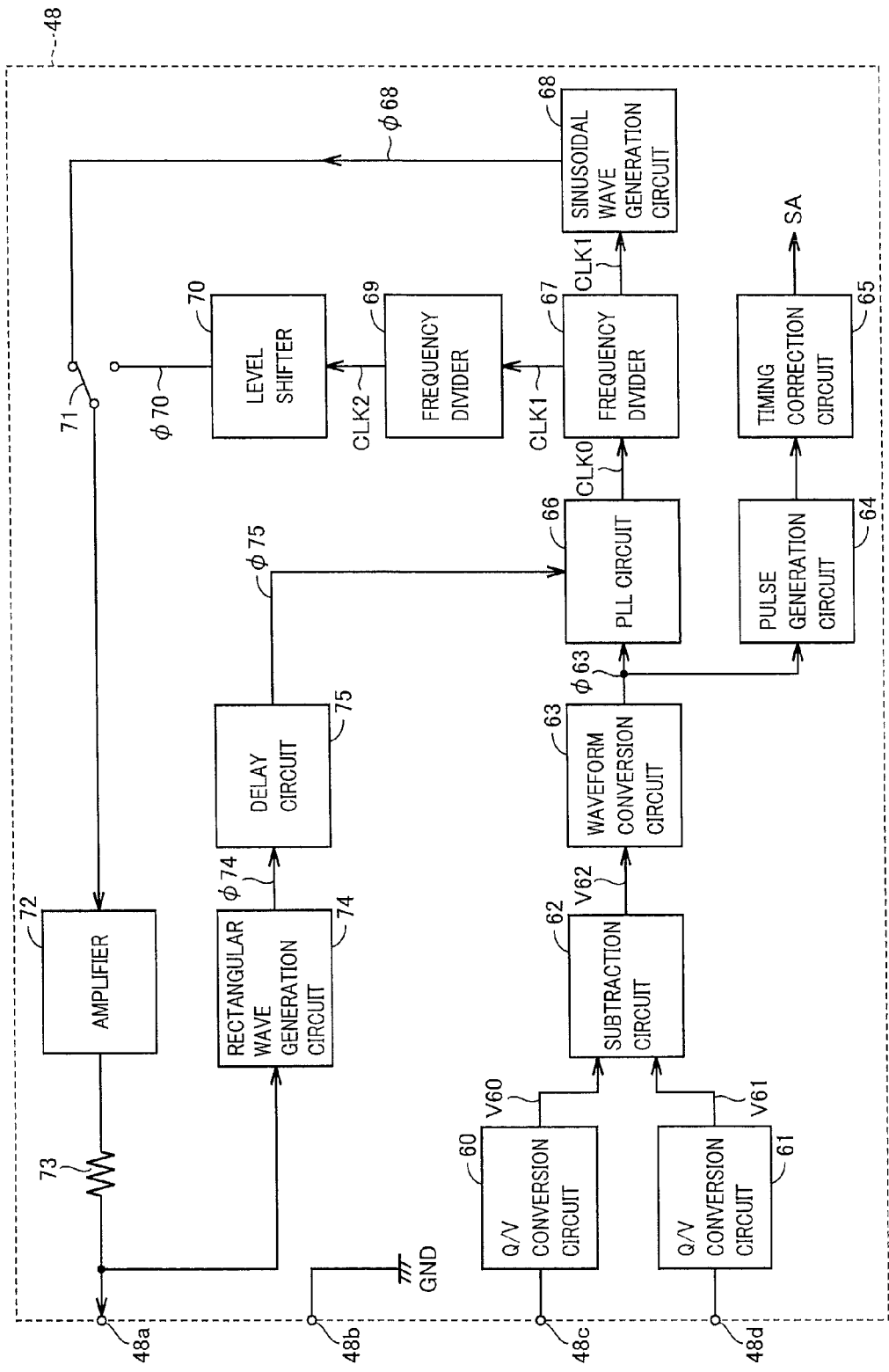
FIG. 20 is a block diagram showing a structure of a driving circuit shown in FIG. 18.

As shown in FIG. 20, driving circuit 48 includes Q/V conversion circuits 60 and 61, a subtraction circuit 62, a waveform conversion circuit 63, a pulse generation circuit 64, a timing correction circuit 65, a phase-locked loop (PLL) circuit 66, frequency dividers 67 and 69, a sinusoidal wave generation circuit 68, a level shifter 70, a switch 71, an amplifier 72, a resistor element 73, a rectangular wave generation circuit 74, and a delay circuit 75.

Q/V conversion circuit 60 is connected to electrodes 11 of piezoelectric elements F1 to F4 through input terminal 48c to convert the quantities of charge generated at electrodes 11 of piezoelectric elements F1 to F4 into voltage V60. Q/V conversion circuit 61 is connected to electrodes 12 of piezoelectric elements F1 to F4 through input terminal 48d to convert the quantities of charge generated at electrodes 12 of piezoelectric elements F1 to F4 into voltage V61. Subtraction circuit 62 generates voltage V62 which is the difference between voltage V60 and voltage V61. Voltage V62 sinusoidally changes in synchronization with the vibration of mass portion 8.

Waveform conversion circuit 63 converts the sinusoidal voltage signal V62 into a rectangular wave signal φ63. Waveform conversion circuit 63 sets, for example, rectangular wave signal φ63 at a certain negative voltage during a period in which voltage V62 is a positive voltage and sets rectangular wave signal φ63 at a certain positive voltage during a period in which voltage V62 is a negative voltage.

Pulse generation circuit 64 generates sampling pulse SA in synchronization with rectangular wave signal φ63. Pulse generation circuit 64 generates sampling pulse SA, for example, in response to each of the rising edge and the falling edge of rectangular wave signal φ63. Timing correction circuit 65 corrects the timing of sampling pulse SA such that the peak values of sinusoidally changing voltages V51 and V52 are sampled by sampling circuits 53 and 54, respectively. Timing correction circuit 65 is formed, for example, of a delay circuit capable of adjusting the delay time.

Figure 21:
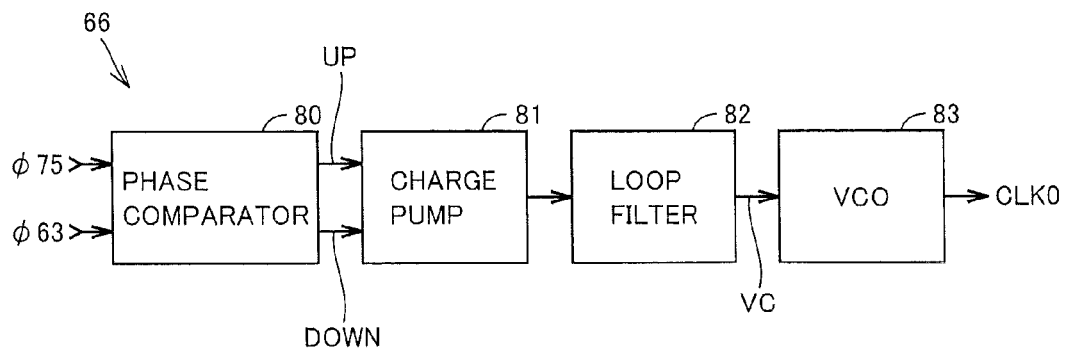
FIG. 21 is a block diagram showing a structure of a phase-locked loop circuit shown in FIG. 20.

Phase-locked loop circuit 66 adjusts the frequency of a clock signal CLK0 such that the phase of a rectangular wave signal φ75 output from delay circuit 75 matches with the phase of output signal φ63 of waveform conversion circuit 63. Phase-locked loop circuit 66 includes a phase comparator 80, a charge pump 81, a loop filter 82, and a voltage-controlled oscillator (VCO) 83, as shown in FIG. 21. Phase comparator 80 compares the phases of rectangular wave signals φ63 and φ75, outputs a signal UP having a pulse width corresponding to the phase difference between signals φ75 and φ63 if the phase of signal φ75 lags behind the phase of signal φ63, and outputs a signal DOWN having a pulse width corresponding to the phase difference between signals φ75 and φ63 if the phase of signal φ75 leads the phase of signal φ63.

Charge pump 81 supplies positive current to loop filter 82 in response to signal UP and supplies negative current to loop filter 82 in response to signal DOWN. Loop filter 82 integrates the output current of charge pump 81 and generates a control voltage VC at a level corresponding to the integrated value. Voltage-controlled oscillator 83 outputs clock signal CLK0 having a frequency corresponding to control voltage VC. Accordingly, signals φ63 and φ75 match in frequency and phase. The frequency of clock signal CLK0 is, for example, 5.12 MHz.

Frequency divider 67 divides the frequency of clock signal CLK0 to generate a clock signal CLK1. The frequency of clock signal CLK1 is 1/32 of clock signal CLK0, for example, 160 KHz. Sinusoidal wave generation circuit 68 generates a sinusoidal wave φ68 based on clock signal CLK1. The frequency of sinusoidal wave signal φ68 is, for example, 20 KHz.

Figure 22:
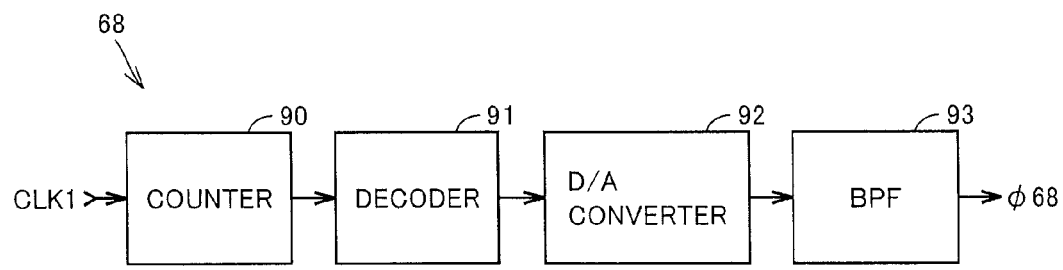
FIG. 22 is a block diagram showing a structure of a sinusoidal wave generation circuit shown in FIG. 20.

As shown in FIG. 22, sinusoidal wave generation circuit 68 includes a counter 90, a decoder 91, a D/A converter 92, and a band-pass filter (BPF) 93, as shown in FIG. 22. Counter 90 counts the number of pulses of clock signal CLK1 and generates a three-bit data signal indicative of the count value. Decoder 91 decodes the three-bit data signal generated by counter 90 and outputs a digital signal having numeric values sinusoidally changing. D/A converter 92 converts the digital signal generated by decoder 91 into an analog voltage signal. The output signal of D/A converter 92 has an unnecessary frequency component eliminated by band-pass filter 93 so as to be sinusoidal wave signal φ68.

Frequency divider 69 further divides the frequency of clock signal CLK1 generated by frequency divider 67 to generate a clock signal CLK2. The frequency of clock signal CLK2 is ⅛ of clock signal CLK1, for example, 20 KHz. Level shifter 70 level-shifts clock signal CLK2 to generate a rectangular wave signal φ70. Switch 71 provides the signal selected from sinusoidal wave signal φ68 and rectangular wave signal φ70 to amplifier 72.

Amplifier 72 amplifies the signal provided from sinusoidal wave generation circuit 68 or level shifter 70 through switch 71 and provides the amplified signal to output terminal 48a through resistor element 73. Output terminal 48b is grounded.

Rectangular wave generation circuit 74 converts sinusoidal wave signal φ68 or rectangular wave signal φ70 appearing at output terminal 48a, into a rectangular wave signal φ74. Delay circuit 75 delays the phase of rectangular wave signal φ74 by 90 degrees to generate a rectangular wave signal 475. Rectangular wave signal 475 is provided to phase-locked loop circuit 66.

Next, the operation of this angular velocity sensor will be described. Clock signal CLK0 of 5.12 MHz generated by phase-locked loop circuit 66 in FIG. 20 is frequency-divided by frequency divider 67 to be clock signal CLK1 of 160 KHz. Clock signal CLK1 is provided to sinusoidal wave generation circuit 68 and frequency divider 69. Sinusoidal wave generation circuit 68 generates sinusoidal wave signal φ68 of 20 KHz based on clock signal CLK1. Clock signal CLK1 is frequency-divided by frequency divider 69 to be clock signal CLK2 of 20 KHz, which is level-shifted by level shifter 70 to be rectangular wave signal φ70.

Switch 71 provides amplifier 72 with the signal (for example, φ68) selected by the user of the angular velocity sensor from sinusoidal wave signal φ68 and rectangular wave signal φ70. The signal selected by switch 71 is amplified by amplifier 72 and provided to electrodes 11 of piezoelectric elements E11 to E18 through resistor element 73 and output terminal 48a. Electrodes 12 of piezoelectric elements E11 to E18 are grounded through output terminal 48b. Accordingly, piezoelectric elements E11 to E18 expand/shrink together to cause mass portion 8 to vibrate in the Z-axis direction.

The signal appearing at output terminal 48a is converted into rectangular wave signal φ74 by rectangular wave generation circuit 74. Rectangular wave signal φ74 is delayed by 90 degrees by delay circuit 75 to be rectangular wave signal φ75, which is provided to phase-locked loop circuit 66.

When mass portion 8 vibrates, charges are generated at electrodes 11 and 12 of piezoelectric elements F1 to F4. These charges are provided to Q/V conversion circuits 60 and 61 through input terminals 48c and 48d, respectively. The quantities of charge generated at electrodes 11 and 12 of piezoelectric elements F1 to F4 are converted into voltages V60 and V61 by Q/V conversion circuits 60 and 61, respectively. Subtraction circuit 62 generates voltage V62 which is the difference between voltages V60 and V61. Voltage V62 is a sinusoidally changing voltage signal. Voltage V62 is converted by waveform conversion circuit 63 into rectangular wave signal φ63, which is provided to phase-locked loop circuit 66 and pulse generation circuit 64.

Phase-locked loop circuit 66 adjusts the frequency of clock signal CLK0 such that rectangular wave signals φ63 and φ75 match in phase. Pulse generation circuit 64 generates sampling pulse SA in synchronization with rectangular wave signal φ63. Sampling pulse SA has the timing corrected by timing correction circuit 65 and is thereafter provided to sampling circuits 53 and 54 in FIG. 19.

When the angular velocity ωy around the Y axis is applied to mass portion 8 vibrating in the Z-axis direction, charge is generated at each of electrodes 11 and 12 of piezoelectric elements D1 and D2. The quantities of charge generated at electrode 11 of piezoelectric element D1 and electrode 12 of piezoelectric element D2, which are connected with each other, are provided to Q/V conversion circuit 51 through input terminal 46a and converted into voltage V51. The quantities of charge generated at electrode 12 of piezoelectric element D1 and electrode 11 of piezoelectric element D2, which are connected with each other, are provided to Q/V conversion circuit 52 through input terminal 46b and converted into voltage V52. Voltages V51 and V52 sinusoidally change as shown in FIGS. 9(e) and 9(f).

Sampling circuits 53 and 54 sample the peak values of voltages V51 and V52, respectively, in response to sampling pulse SA and output voltages V53 and V54, respectively, corresponding to the sampled peak values. Subtraction circuit 55 generates voltage V55 which is the difference between voltages V53 and V54. This voltage V55 is converted into signal Sy indicative of the angular velocity ωy by signal generation circuit 56.

When the angular velocity ωx around the X axis is applied to mass portion 8 vibrating in the Z-axis direction, charge is generated at each of electrodes 11 and 12 of piezoelectric elements D3 and D4. Subtraction circuit 47 in FIG. 18 generates signal Sx indicative of the angular velocity ωx in a similar manner as in operation circuit 46.

Figure 23:
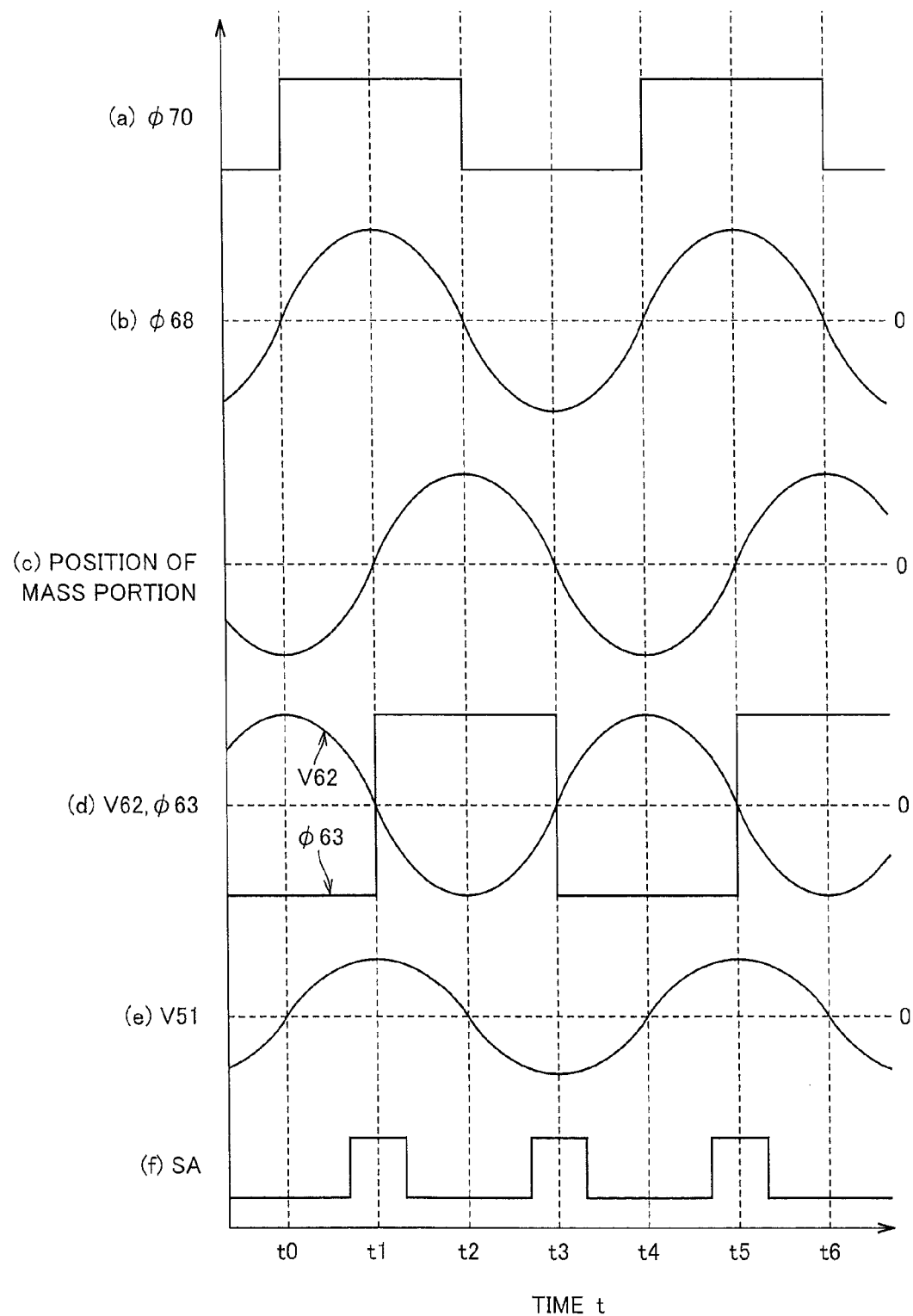
FIG. 23 is a time chart showing an operation of the angular velocity sensor shown in FIG. 17 to FIG. 22.

FIGS. 23(a) to 23(f) are time charts showing the operation of this angular velocity sensor. As shown in FIGS. 23(a) and 23(b), rectangular wave signal φ70 output from level shifter 70 and sinusoidal wave signal φ68 generated by sinusoidal wave generation circuit 68 are signals having the same frequency. Rectangular wave signal φ70 or sinusoidal wave signal φ68 is amplified by amplifier 72 to be applied to piezoelectric elements E11 to E18, causing mass portion 8 to vibrate in the Z-axis direction. The vibration of mass portion 8 is represented by a sinusoidal wave 90 degrees behind signals φ70 and φ68, as shown in FIG. 23(c).

When the charges appearing between electrodes 11 and 12 of piezoelectric elements F1 to F4 are converted into voltage V62, the phase of voltage V62 is opposite to the phase of the vibration of mass portion 8, as shown in FIG. 23(d). Voltage V62 is converted into rectangular wave signal φ63 by waveform conversion circuit 63. Rectangular wave signal φ63 is in phase with signal φ75 which is 90 degrees behind signals φ70 and φ68.

The phase of the signal (for example, voltage V51) indicative of the Coriolis force detected by piezoelectric elements D1 to D4 is shifted by 90 degrees from rectangular wave signal φ63, as shown in FIG. 23(e). Voltage V51 attains a positive peak value at the rising edge of rectangular wave signal φ63 and attains a negative peak value at the falling edge of rectangular wave signal φ63. Then, as shown in FIG. 23(f), sampling pulse SA is generated to be synchronized with the rising edge and falling edge of rectangular wave signal φ63, so that the peak value of voltage V51 is sampled in response to sampling pulse SA.

In the second embodiment, the signal applied to electrodes 11 of piezoelectric elements E11 to E18 is delayed by 90 degrees to generate rectangular wave signal φ75, an output signal from piezoelectric elements F1 to F4 is converted into rectangular wave signal φ63, and the phases of rectangular wave signals φ75 and φ63 are matched using phase-locked loop circuit 66. This allows mass portion 8 to vibrate at a resonance frequency even with a temperature change, thereby detecting the angular velocity with high accuracy.

Since the phases of rectangular wave signals φ75 and φ62 are matched using phase-locked loop circuit 66, the resistance value of resistor element 73 can be set large, thereby achieving reduction of power consumption.

The second embodiment uses sinusoidal wave generation circuit 68 to generate sinusoidal wave signal φ68, uses frequency divider 69 and level shifter 70 to generate rectangular wave signal φ70, and uses switch 71 to select the desired signal from signals φ68 and φ70. However, frequency divider 69, level shifter 70, and switch 71 may be eliminated and sinusoidal wave signal φ68 may be always provided to amplifier 72. Conversely, sinusoidal wave generation circuit 68 and switch 71 may be eliminated and rectangular wave signal φ70 may be always provided to amplifier 72.

Figure 24:
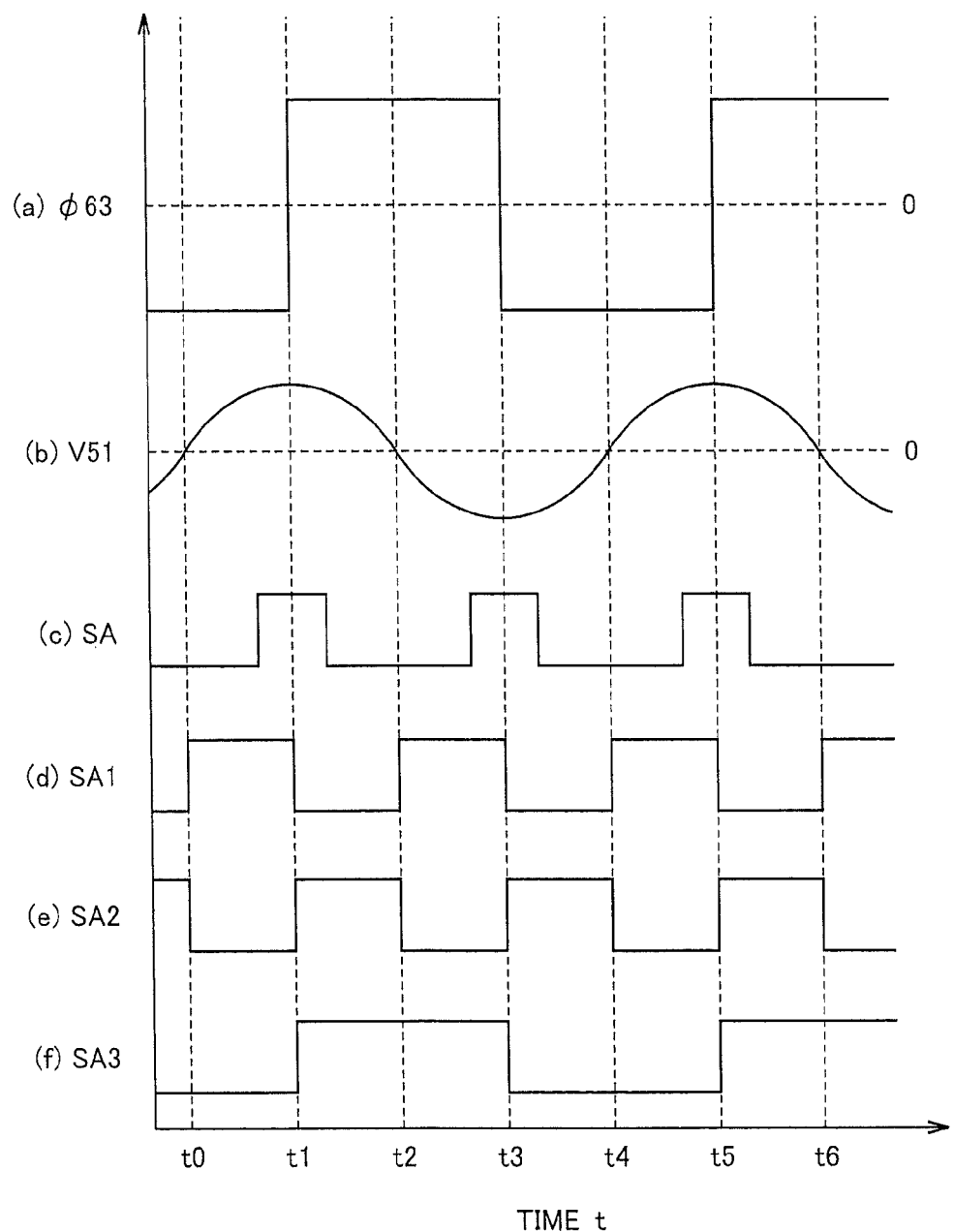
FIG. 24 is a time chart showing a modification of the second embodiment.

As shown in FIGS. 24(a) to 24(c), sampling pulse SA synchronized with rectangular wave signal φ63 is generated to sample the peak value of the signal indicative of the Coriolis force (for example, voltage V51). However, any signal that is synchronized with rectangular wave signal φ63 may be used as a sampling pulse. For example, as shown in FIG. 24(d), an inversion signal SA1 which has a frequency twice that of rectangular wave signal φ63 may be generated, and the peak value of voltage V51 may be sampled in response to each falling edge of signal SA1. Alternatively, as shown in FIG. 24(e), a signal SA2 which has a frequency twice that of rectangular wave signal φ63 may be generated, and the peak value of voltage V51 may be sampled in response to each rising edge of signal SA2.

As shown in FIG. 23(f), a signal SA3 which has the same frequency as that of rectangular wave signal φ63 may be generated, and the peak value of voltage V51 may be sampled in response to each rising edge and falling edge of signal SA3. Alternatively, only the positive peak value of voltage V51 may be sampled in response to only the rising edge of signal SA3, or only the negative peak value of voltage V51 may be sampled in response to only the falling edge of signal SA3.

Third Embodiment

Figure 25:
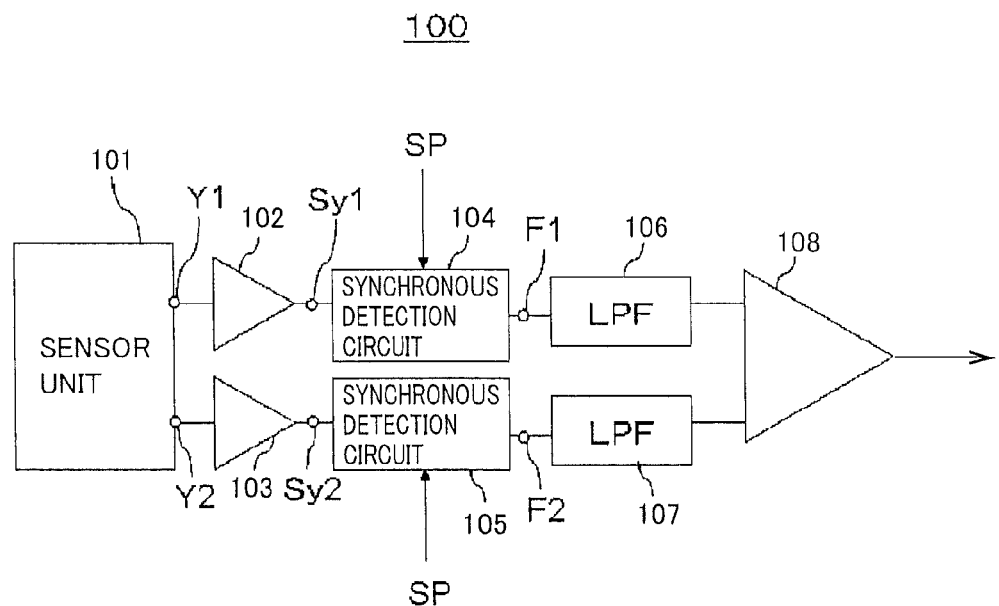
FIG. 25 is a diagram showing a structure of an angular velocity sensor according to a third embodiment of the present invention.

FIG. 25 is a block diagram showing a structure of an angular velocity sensor according to a third embodiment of the present invention. In FIG. 25, an angular velocity sensor 100 includes a sensor unit 101, charge amplifiers 102 and 103, synchronous detection circuits 104 and 105, low-pass filters 106 and 107, and a differential amplifier 108. Sensor unit 101 includes a not-shown piezoelectric element and outputs charges Y1 and Y2. Charges Y1 and Y2 are output by the piezoelectric element for detecting the angular velocity in sensor unit 101 and include charge produced by the angular velocity detected by the piezoelectric element and charge produced by a driving signal for vibrating the piezoelectric element. When no angular velocity is applied to the piezoelectric element, only the charge produced by the driving signal is output. Charge Y1 and charge Y2 are output with phases shifted from each other by 180 degrees.

Charge amplifiers 102 and 103 convert charges Y1 and Y2, respectively, output from sensor unit 101 into voltages. Charge amplifier 102 receives charge Y1 from sensor unit 101, and charge Y1 is charged in a capacitor (not shown) in charge amplifier 102 and converted into voltage, which is output as a sensor signal Sy1. Charge amplifier 103 receives charge Y2 from sensor unit 101, and charge Y2 is charged in a capacitor (not shown) in charge amplifier 103 and converted into voltage, which is output as a sensor signal Sy2. Each of sensor signals Sy1 and Sy2 includes two signal components, namely, an angular velocity signal component obtained by converting the charge produced by the angular velocity into voltage and a driving signal component obtained by converting the charge produced by the driving signal into voltage.

Synchronous detection circuits 104 and 105 extract the angular velocity signal components from composite signals of the angular velocity signal components and the driving signal components included in sensor signals Sy1 and Sy2 input from charge amplifiers 102 and 103, respectively. Synchronous detection circuit 104 receives sensor signal Sy1 and synchronous detection circuit 105 receives sensor signal Sy2. Synchronous detection circuits 104 and 105 are both controlled by a sampling pulse SP. Synchronous detection circuit 104 samples sensor signal Sy1 at a prescribed level of sampling pulse SP at prescribed intervals to output a detection output F1. Synchronous detection circuit 105 samples sensor signal Sy2 at a prescribed level of sampling pulse SP at prescribed intervals to output a detection output F2. The structure of synchronous detection circuits 104 and 105 and sampling pulse SP will be described later.

Low-pass filters 106 and 107 remove high-frequency components remaining in detection outputs F1 and F2, respectively. Low-pass filter 106 removes a high-frequency component of detection output F1 output from synchronous detection circuit 104. Low-pass filter 107 removes a high-frequency component of detection output F2 output from synchronous detection circuit 105. Two signals from which high-frequency components are removed by low-pass filters 106 and 107 are input to differential amplifier 108.

Differential amplifier 108 receives the output signals of low-pass filters 106 and 107 and outputs the amplified difference between the two output signals thereby outputting a voltage at a level corresponding to the angular velocity applied to the vibrating sensor. Charges Y1 and Y2, output from sensor unit 101 with a phase difference therebetween of 180 degrees, are extracted as angular velocity signal components by synchronous detection circuits 104 and 105, respectively, and input to differential amplifier 108, which combines the angular velocity components together. Differential amplifier 108 not only amplifies the output signals of low-pass filters 106 and 107 but also removes an offset signal which is a noise component. As an offset signal is also included in differential amplifier 108 itself, it is sometimes necessary to include several different amplifiers depending on the degree of amplification. Then, an offset signal may be removed for each amplifier.

The angular velocity sensed by sensor unit 101 is converted into an analog signal by differential amplifier 108 and is thereafter converted into a digital signal, for example, by an AD converter connected at the stage following differential amplifier 108. The digital signal is used for digital processing in a microcomputer at the following stage.

Figure 26:
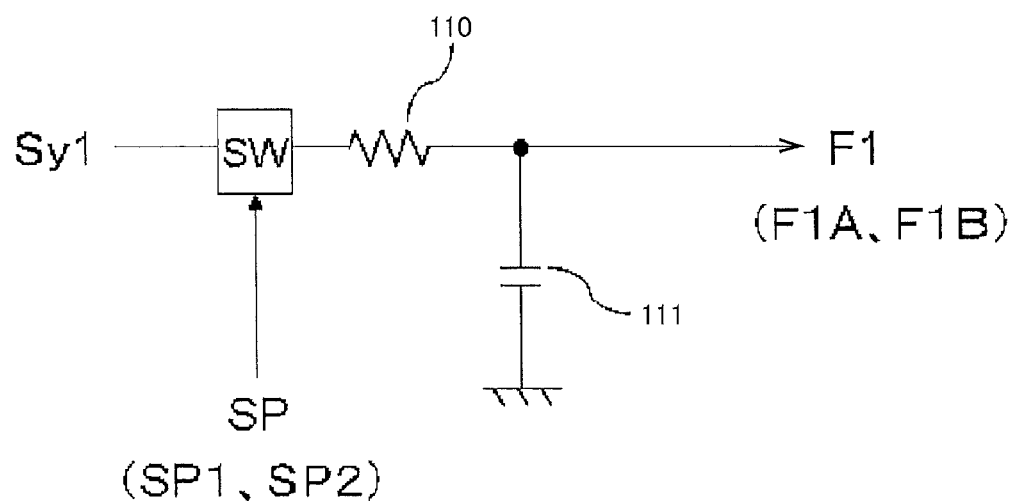
FIG. 26 is a diagram showing a structure of a synchronous detection circuit shown in FIG. 25.

FIG. 26 is a circuit diagram showing a structure of synchronous detection circuit 104 shown in FIG. 25. In the following, synchronous detection circuits 104 and 105 and sampling pulse SP for use in angular velocity sensor 100 will be described. It is noted that synchronous detection circuits 104 and 105 have the same circuit structure and therefore synchronous detection circuit 104 will be described.

Synchronous detection circuit 104 is configured to include an analog switch SW, a resistor element 110, and a capacitor 111, as shown in FIG. 26. Resistor element 110 and capacitor 111 constitute an integration circuit, that is, a low-pass filter.

The input terminal of analog switch SW receives sensor signal Sy1 in FIG. 25. Analog switch SW is controlled by sampling pulse SP. Sampling pulse SP is generated based on a driving signal for vibrating the piezoelectric element (not shown) provided in sensor unit 101 or a signal synchronized with the driving signal. A simple circuit of analog switch SW is formed of, for example, one MOS transistor. Sampling pulse SP is supplied to the gate of the MOS transistor. When sampling pulse SP is at an activation level (for example, high level), the MOS transistor enters a current-flowing state, that is, an ON state, so that sensor signal Sy1 is supplied to the integration circuit consisting of resistor element 110 and capacitor 111. Analog switch SW turns to an ON state or an OFF state in response to a state of sampling pulse SP. However, in order to increase the response speed, analog switch SW is desirably formed of a transfer gate having an N-channel MOS transistor and a P-channel MOS transistor connected in parallel. In this case, the sampling pulse at a prescribed level is separately supplied to each of the gates of the N-channel MOS transistor and the P-channel MOS transistor to perform control such that the two MOS transistors simultaneously turn to the ON state or the OFF state.

Resistor element 110 and capacitor 111 form an integration circuit. When analog switch SW is in the ON state, sensor signal Sy1 is input from the output terminal of analog switch SW to the input node of the integration circuit. When the voltage of the input sensor signal Sy1 is greater than the voltage of detection output F1, charge is stored in capacitor 111. When the voltage of sensor signal Sy1 is equal to the voltage of detection output F1, the charge in capacitor 111 is held. When the voltage of sensor signal Sy1 is smaller than the voltage of detection output F1, the charge stored in capacitor 111 is discharged.

The frequency of sensor signal Sy1 is determined by the driving signal. The frequency of sensor signal Sy1 is equal to the frequency of the driving signal. The frequency of the driving signal has a fixed value depending on an individual angular velocity sensor. It is generally said that the angular velocity detection accuracy of the sensor is high with a lower frequency of the driving signal, but the frequencies lower than 20 KHz belong to the audio-frequency range. It is desirable that sensors installed in products directly manipulated by persons, such as digital cameras or video cameras, should be used in a range exceeding the audio-frequency range so that harsh sounds cannot be heard. However, when it comes to out of the audio-frequency range, the frequency of the driving signal would be 20 KHz or higher. However, as disclosed in Patent Literature 7, considering the report that hearing decreases at frequencies exceeding 1 KHz, the driving signal having the frequency of 1 KHz or higher, rather than 20 KHz, can satisfy the practical level.

For example, if the frequency of the driving signal is 20 KHz, when a resistance value R1 of resistor element 110 is set at 1 KΩ and a capacitance value C1 of capacitor 111 is set at 10 nF, the cut-off frequency fc of the low-pass filter consisting of resistor element 110 and capacitor 111 is written as fc=1/(2πR1C1). Therefore, resistor element 110 and capacitor 111 constitute a low-pass filter with cut-off frequency fc=16 KHz. If the cut-off frequency fc of the low-pass filter consisting of resistor element 110 and capacitor 111 is set equivalent to the frequency of the driving signal, sensor signal Sy1 input to synchronous detection circuit 104 can be avoided from being significantly attenuated by resistor element 110 and capacitor 111. The cut-off frequency fc of the low-pass filter consisting of resistor element 110 and capacitor 111 is also set to 1 KHz or higher, similar to the frequency of the driving signal.

Sampling pulse SP is generated by a not-shown sampling pulse generation circuit. The sampling pulse generation circuit receives a driving signal or a signal synchronized with the driving signal and generates sampling pulse SP based on the input signal.

Figure 27:
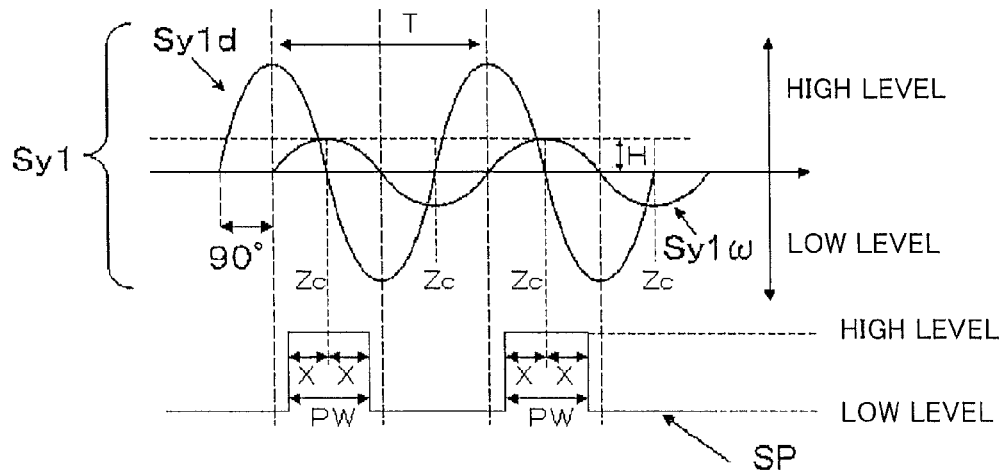
FIG. 27 is a diagram showing the relation between two signals included in a sensor signal and a sampling pulse shown in FIG. 25.

FIG. 27 is a diagram schematically showing the relation between the two signals included in sensor signal Sy1 and sampling pulse SP. Sensor signal Sy1 includes two signals, namely, a driving signal component Sy1$d$ and an angular velocity signal component Sy1$\omega$, where these signal components have phases shifted from each other by 90 degrees. Sampling pulse SP goes to a high level with a pulse width PW shorter than ½ of a cycle T of angular velocity signal component Sy1$\omega$ when angular velocity signal component Sy1$\omega$ is at a high level with respect to the reference voltage, and has the same cycle as cycle T of angular velocity signal component Sy1$\omega$. In the third embodiment, analog switch SW is in the ON state when sampling pulse SP is at the high level, and is in the OFF state when sampling pulse SP is at the low level. However, analog switch SW may be in the ON state when sampling pulse SP is at the low level and in the OFF state when it is at the high level.

Since driving signal component Sy1$d$ and angular velocity signal component Sy1$\omega$ are shifted in phase from each other by 90 degrees, angular velocity signal component Sy1$\omega$ has the maximum value H before and after a zero cross point Zc of driving signal component Sy1$d$. Therefore, if the sampling is performed with sampling pulse SP set to the high level before and after zero cross point Zc of driving signal component Sy1$d$, the sampling can be performed when driving signal component Sy1$d$, which is an unnecessary signal, has a value close to zero and when angular velocity signal component Sy1$\omega$ has the maximum value. Therefore, angular velocity signal component Sy1$\omega$ can be sampled in a state in which the superposition of driving signal component Sy1$d$ is smallest. Thus, driving signal component Sy1$d$ takes a value closer to zero with a smaller pulse width PW of sampling pulse SP, thereby improving the signal removing effect for driving signal component Sy1$d$.

In a case where no noise is included in sensor signal Sy1, and driving signal component Sy1$d$ and angular velocity signal component Sy1$\omega$ are shifted in phase from each other exactly by 90 degrees, sampling is performed using sampling pulse SP which goes to a high level with a pulse width x at the same intervals before and after zero cross point Zc of driving signal component Sy1$d$, so that driving signal component Sy1$d$ is cancelled with the signals before and after zero cross point Zc and, therefore, driving signal component Sy1$d$ can be reduced to zero. Accordingly, the sampling of angular velocity signal component Sy1$\omega$ can be performed in a state in which the superposition of driving signal component Sy1$d$ is smallest.

It is known that detection output F1 of synchronous detection circuit 104 has a voltage equal to or lower than 2/π (63.6%) of the maximum value H of the input angular velocity signal component Sy1$\omega$ when the duty ratio of sampling pulse SP is 50%.

Figure 28:
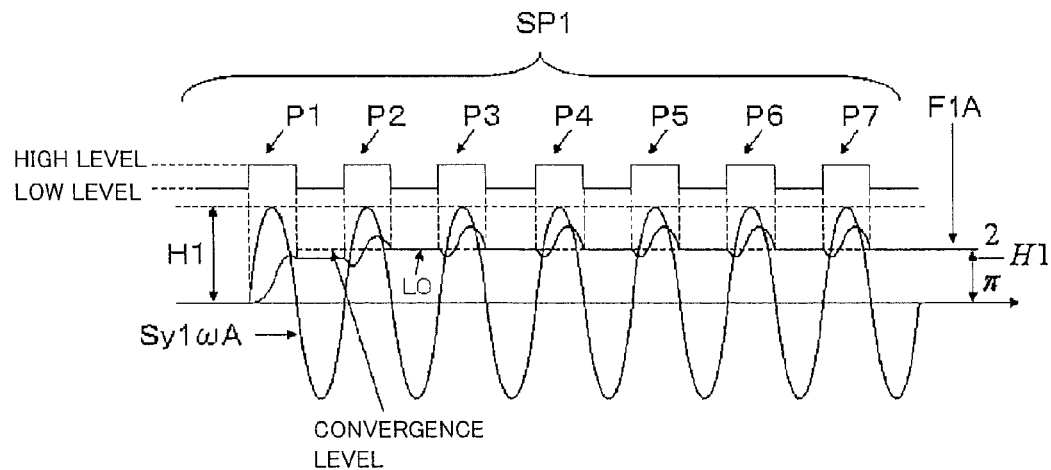
FIG. 28 is a diagram schematically showing the changing voltage of a detection output of the synchronous detection circuit in a case where the duty ratio of the sampling pulse is 50%.

FIG. 28 is a diagram schematically showing the relation of an angular velocity signal component Sy1$\omega$A with a detection output F1A of synchronous detection circuit 104 and a sampling pulse SP1 where the duty ratio of sampling pulse SP shown in FIG. 27 is 50%. Although driving signal component Sy1*d* is also input to synchronous detection circuit 104 as shown in FIG. 27, driving signal component Sy1*d* is not shown in FIG. 28 for the sake of convenience because in principle, it can be removed by performing sampling at the same intervals before and after zero cross point Zc of driving signal component Sy1*d*. Therefore, in the following description, the effects of driving signal component Sy1*d* will not be considered. Sampling pulse SP1 is input to synchronous detection circuit 104, and every time pulses P1, P2, P3, P4, P5, P6, and P7 are input, the voltage of detection output F1A changes. At a level L0, detection output F1A synchronously detected by sampling pulse SP1 converges to $2/\pi$ (63.6%) of the maximum value H1 of angular velocity signal component Sy1ωA. FIG. 28 schematically shows a state in which the convergence level $(2/\pi)$ H1 has not yet been reached immediately after the input of pulse P1, and the almost convergence level $(2/\pi)$ H1 is reached immediately after the input of pulse P2. In other words, it is shown that the convergence level $(2/\pi)$ H1 has already been reached at the second pulse P2, where seven pulses of sampling pulse SP1, pulses P1 to P7, are shown.

For example, assume that angular velocity signal component Sy1ωA is a sinusoidal wave signal of 1.5V±0.095V with a frequency of 20 KHz, the frequency of sampling pulse SP1 is 20 KHz, the resistance value R1 of resistor element 110 shown in FIG. 26 is 1 KΩ, and the capacitance value C1 of capacitor 111 is 10 nF. It is noted that the resistance value R1 of resistor element 110 can be set in a range of 500Ω to 2 kΩ, and the capacitance value C1 of capacitor 111 can be set in a range of 5 nF to 20 nF.

When sampling pulse SP1 is at the high level and when the voltage of angular velocity signal component Sy1ωA is greater than the voltage of detection output F1A, the charge is stored in capacitor 111. When the sampling pulse SP1 is at the high level and when the voltage of angular velocity signal component Sy1ωA is smaller than the voltage of detection output F1A, the charge stored in capacitor 111 is discharged, so that the voltage of detection output F1A decreases. Then, when sampling pulse SP1 is at the low level, capacitor 111 holds the stored charge, so that detection output F1A is held at a certain voltage. The repetition of this operation yields the mean value of the voltage of angular velocity signal component Sy1ωA in a period during which sampling pulse SP1 is at the high level, so that detection output F1A attains $2/\pi$ (63.6%) of the maximum value H1 of the input angular velocity signal component Sy1ω.

Figure 29:
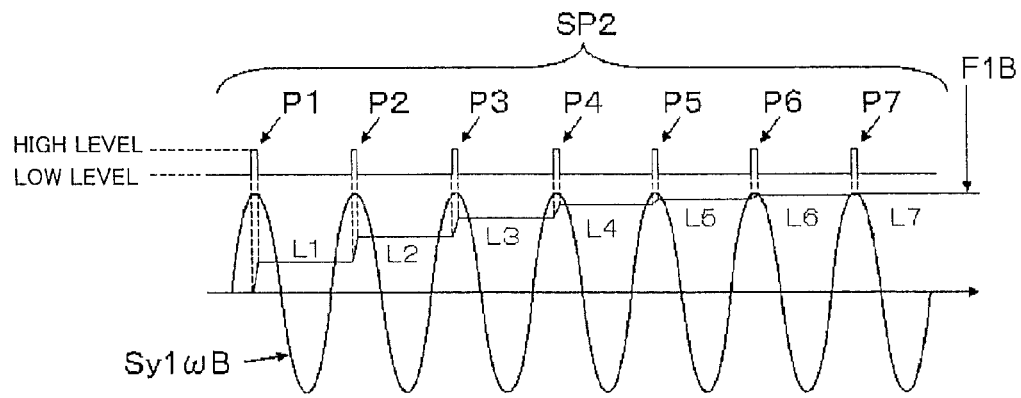
FIG. 29 is a diagram schematically showing the changing voltage of a detection output of the synchronous detection circuit in a case where the duty ratio of the sampling pulse is, for example, 10%, which is a value sufficiently smaller than 50%.

FIG. 29 is a diagram schematically showing the relation of an angular velocity signal component Sy1ωB with a detection output F1B of synchronous detection circuit 104 and a sampling pulse SP2 where the duty ratio of sampling pulse SP shown in FIG. 27 is, for example, 10%, which is a value sufficiently smaller than 50%. Although driving signal component Sy1*d* is also input to synchronous detection circuit 104 as shown in FIG. 27, driving signal component Sy1*d* is not shown in FIG. 29 for the sake of convenience because in principle, it can be removed by performing sampling at the same intervals before and after zero cross point Zc of driving signal component Sy1*d* and by performing sampling in the vicinity of the small displacement of driving signal component Sy1*d* and the greatest displacement of angular velocity signal component Sy1ωB. Therefore, in the following description, the effects of driving signal component Sy1*d* will not be considered. Sampling pulse SP2 is input to synchronous detection circuit 104, and every time pulses P1, P2, P3, P4, P5, P6, and P7 are input, the voltage of detection output F1B changes.

For example, assume that angular velocity signal component Sy1ωB is a sinusoidal wave signal of 1.5V±0.095V with a frequency of 20 KHz, the frequency of sampling pulse SP2 is 20 KHz, the resistance value R1 of resistor element 110 is 1 KΩ, and the capacitance value C1 of capacitor 111 is 10 nF. It is noted that resistor element 110 can be set, for example, in a range of 500Ω to 2 kΩ and capacitor 111 can be set, for example, in a range of 5 nF to 20 nF. In FIG. 28 and FIG. 29, the other conditions excluding the duty ratios of sampling pulse SP1 and sampling pulse SP2 are the same.

In the case where the duty ratio is 10%, similar to the case where it is 50%, when sampling pulse SP2 is at the high level and when the voltage of angular velocity signal component Sy1ωB is greater than the voltage of detection output F1B, the charge is charged in capacitor 111. When sampling pulse SP2 is at the high level and when the voltage of angular velocity signal component Sy1ωB is smaller than the voltage of detection output F1B, the charge stored in capacitor 111 is discharged, so that the voltage of detection output F1B decreases. Then, when sampling pulse SP2 is at the low level, capacitor 111 holds the stored charge, so that detection output F1B is held at a certain voltage. The repetition of this operation results in convergence at the mean value of the voltage of angular velocity signal component Sy1ωB in a period during which sampling pulse SP2 is at the high level. The peak value of the voltage of angular velocity signal component Sy1ωB or the vicinity thereof is extracted by sampling pulse SP2, so that the charge of capacitor 111 is hardly discharged and the charge can be stored in capacitor 111 up to a value close to the maximum value of angular velocity signal component Sy1ωB.

Actually, sensor signal Sy1, which is a composite signal of driving signal component Sy1*d* and angular velocity signal component Sy1ω shown in FIG. 27, is input to synchronous detection circuit 104 shown in FIG. 26. Therefore, the transition of detection output F1 differs from the transitions of detection output F1A and detection output F1B shown in FIG. 28 and FIG. 29, and the transition occurs with comparison between the voltage of detection output F1 and the voltage of sensor signal Sy1. However, as shown in FIG. 27, in principle, driving signal component Sy1*d* can be removed by performing sampling with pulse width x at the same intervals before and after zero cross point Zc of driving signal component Sy1*d* and by performing sampling in the vicinity of the small displacement of driving signal component Sy1*d* and the largest displacement of angular velocity signal component Sy1ω. Therefore, the convergence value of detection output F1 is a value close to the values of detection output F1A and detection output F1B shown in FIG. 28 and FIG. 29. With the reduced duty ratio of sampling pulse SP in this manner, as shown in FIG. 29, detection output F1B of synchronous detection circuit 104 can converge to the value closer to the maximum value of angular velocity signal component Sy1ωB.

As shown in FIG. 29, it has been found that when the duty ratio of sampling pulse SP2 is reduced, the time taken for detection output F1B to converge to a certain value becomes longer than the time taken for detection output F1A shown in FIG. 28 to converge to a certain value. Here, returning to FIG. 26 and FIG. 27 again, the difference of the characteristics in FIG. 28 and FIG. 29 will be explained.

In FIG. 26, the voltage of capacitor 111 of the integration circuit consisting of resistor element 110 and capacitor 111, that is, the voltage of detection output F1 can be expressed by the following Equation (1) where the voltage input to the integration circuit is DC voltage V. Here, in Equation (1), symbol F1 represents the voltage of detection output F1, symbol V represents DC voltage, symbol t represents time, symbol c1 represents the capacitance value of capacitor 111, and symbol r1 represents the resistance value of resistor element 110.

$$F1 = V\left(1 - e^{-\frac{t}{c1r1}}\right) \qquad (1)$$

As shown in FIG. 27, as angular velocity signal component Sy1ω is a sinusoidal wave signal, Equation (1) cannot be applied as it is to obtain detection output F1. However, as the duty ratio of sampling pulse SP is reduced, the amount of change of angular velocity signal component Sy1ω in the sampling period decreases, so that it can be considered as DC voltage and substantially can be approximated by Equation (1).

As is clear from Equation (1), the voltage of detection output F1 substantially rises with time t. As the duty ratio of sampling pulse SP is reduced, the sampling time in one cycle is shortened, so that the time taken for the value of detection output F1 to converge increases.

Sampling time ts1 can be expressed by the following Equation (2) where the frequency of the sampling pulse is f and the duty ratio of the sampling pulse is DR (%). In other words, sampling time ts1 is inversely proportional to the sampling frequency and is proportional to the duty ratio DR.

$$ts1 = \frac{DR}{f} \times \frac{1}{100} \qquad (2)$$

According to Equation (2), sampling time ts1 is reduced with the smaller duty ratio DR. Therefore, the time taken to converge increases when the duty ratio of sampling pulse SP2 in FIG. 29 is 10%, as compared with when the duty ratio of sampling pulse SP1 shown in FIG. 28 is 50%. However, as is clear from Equation (1), the value of detection output F1 depending on time t can be increased by changing the time constant of capacitor 111 and resistor element 110 to a smaller value. Therefore, by adjusting the time constant of capacitor 111 and resistor element 110, the time taken for the value of detection output F1B to converge can be set short even with a smaller duty ratio as in sampling pulse SP2, and in addition, a prescribed time can be set.

In FIG. 29, for example, when the frequency of angular velocity signal component Sy1ωB is 20 KHz, the frequency f of sampling pulse SP2 is also 20 KHz, the duty ratio DR of sampling pulse SP2 is 10%, the resistance value R1 of resistor element 110 is 1 KΩ, the capacitance value C1 of capacitor 111 is 10 nF, and angular velocity signal component Sy1ωB in the sampling period can be approximated as DC voltage V by sampling pulse SP2, the value taken by each level L1, L2, L3, L4, L5, L6, and L7 of detection output F1B after the input of pulses P1, P2, P3, P4, P5, P6, and P7 will be described.

After the input of pulse P1, detection output F1B increases to level L1 and holds the voltage at level L1 until pulse P2 is input. The sampling time at pulse P1 can be found by Equation (2). Thus, the voltage of level 1 of detection output F1B can be found by substituting the sampling time at pulse P1 for the time t found by Equation (1). The voltage of level L1 of detection output F1B increases up to the value of 0.393×V.

After the input of pulse P2, detection output F1B increases to level 2 and holds the value of level L2 until pulse P3 is input. Since the voltage of level L2 of detection output F1B is determined by the time in which sampling is performed by pulse P1 and pulse P2, the voltage of level L2 of detection output F1B is 0.632×V, based on Equation (1).

Thereafter, similarly, after the input of pulse P3, the voltage of level L3 of detection output F1B increases up to 0.777×V. After the input of pulse P4, the voltage of level L4 of detection output F1B increases up to 0.865×V, and after the input of pulse P5, the voltage of level L5 of detection output F1B increases up to 0.918×V. After the input of pulse P6, the voltage of level L6 of detection output F1B increases up to 0.950×V, and after the input of pulse P7, the voltage of level L7 of detection output F1B increases up to 0.970×V. In other words, detection output F1B converges after the input of pulse P7. It is understood that this is slow as compared with the convergence at pulse P2 shown in FIG. 28.

However, for example, if the resistance value R1 of resistor element 110 is set to 1 kΩ and the capacitance value C1 of capacitor 111 is set to 1 nF, with the other conditions unchanged, such that the time constant of resistor element 110 and capacitor 111 is one-tenth, the voltage of level L1 of detection output F1B increases up to 0.993×V after the input of pulse P1, and detection output F1B converges immediately after the input of pulse P1. That is, the speed of convergence of detection output F1B can be adjusted by adjusting the time constant of resistor element 110 and capacitor 111 of the integration circuit.

Angular velocity signal component Sy1ω shown in FIG. 27 which is input to synchronous detection circuit 104 is actually a sinusoidal wave signal. Since angular velocity signal Sy1ω is not a constant voltage, the voltage does not always increase with the time spent. Rather, capacitor 111 shown in FIG. 26 discharges as a result of comparison between the voltage of sensor signal Sy1 and the voltage of detection output F1 shown in FIG. 26, so that the voltage of detection output F1 shown in FIG. 26 decreases and does not increase from a certain voltage.

Now, a description will be given on to which level of the maximum value of angular velocity signal Sy1ω, which is a sinusoidal wave signal, the value of detection output F1 can be changed by the duty ratio DR of sampling pulse SP in FIG. 26 and FIG. 27.

The value of detection output F1 converges to the mean value of the voltage of angular velocity signal component Sy1ω at the time when sampling pulse SP is at the high level. When angular velocity signal component Sy1ω input to synchronous detection circuit 104 is expressed by a function f(t) changing with time t, and angular velocity signal component Sy1ω has cycle T=2π and is a sinusoidal wave with the maximum value H, the function f(t) of angular velocity signal component Sy1ω can be expressed by the following Equation (3).

$$f(t) = H \sin t \qquad (3)$$

In Equation (3), the time t at which function (f) takes on the maximum value is expressed as t=2πn+(π/2) where n is an integer. Here, if n=0, the maximum value is taken at t=7π/2. If sampling pulse SP goes to the high level at pulse width x which is equal before and after the point where angular velocity signal component Sy1ω has the maximum value, the period in which sampling pulse SP goes to the high level is from t=(π/2)−x to t=(π/2)+x. The mean value in this period is the value to which detection output F1 converges, and, therefore, the value to which detection output F1 converges is expressed by the following Equation (4).

$$F1 = H\left(\int_{\frac{\pi}{2}-x}^{\frac{\pi}{2}+x} \sin t \, dt\right) \div 2x + H\frac{\sin x}{x} \quad (4)$$

By expressing pulse width x in Equation (4) with the duty ratio DR (%) of sampling pulse SP, it can be determined to which degree of maximum value H of angular velocity signal component Sy1ω, which is a sinusoidal wave signal, the value of detection output F1 can be changed by duty ratio DR of sampling pulse SP.

Where cycle T=2π and the pulse width of sampling is 2x, duty ratio DR=(x/π)×(1/100). Thus, pulse width x=πDR×(1/100) is obtained, which is substituted in Equation (4) to express detection output F1 by the following Equation (5) as a function of duty ratio DR.

$$F1 = H\frac{\left(\sin \pi DR \times \frac{1}{100}\right)}{\pi DR \times \frac{1}{100}} \quad (5)$$

For example, when duty ratio DR of sampling pulse SP is 50%, which is substituted in Equation (5), F1=H(2/π) results. It is understood that the value at which detection output F1 converges is 2/π (63.6%) of the maximum value H of angular velocity signal component Sy1ω in the case of duty ratio DR 50%.

Figure 30:
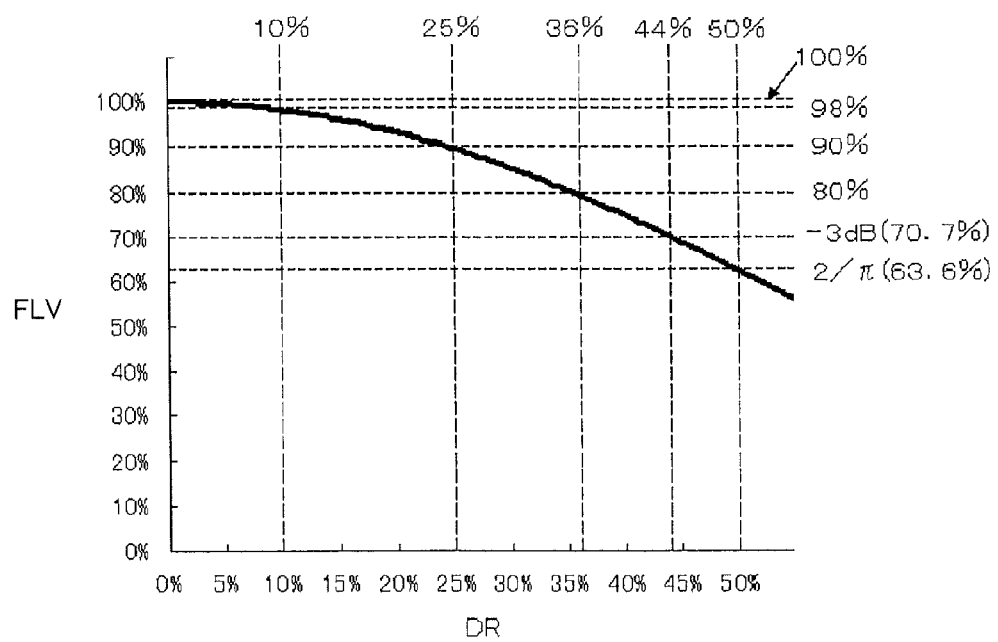
FIG. 30 is a diagram showing the relation between the ratio of convergence of voltage of the detection output with respect to an angular velocity signal component of the synchronous detection circuit shown in FIG. 25 and the duty ratio of the sampling pulse of the synchronous detection circuit.

FIG. 30 schematically shows the ratio FLV of convergence of detection output F1 with respect to angular velocity signal component Sy1ω depending on duty ratio DR of sampling pulse SP, that is, FLV=F1/Sy1ω, based on Equation (5). For example, it is understood that the voltage of detection output F1 attains −3 dB (70.7%) compared to the maximum value H of the input angular velocity signal component Sy1ω when duty ratio DR=44%.

It is also understood that when duty ratio DR is 36%, the value at which detection output F1 converges is the value of 80% of maximum value H of angular velocity signal component Sy1ω. Then, if duty ratio is 25%, the value at which detection output F1 converges is the value of 90% of maximum value H of angular velocity signal component Sy1ω. With duty ratio DR being reduced, the value at which detection output F1 converges comes closer to maximum value H of angular velocity signal component Sy1ω. If the duty ratio DR is 10%, the value at which detection output F1 converges is the value of 98% of maximum value H of angular velocity signal component Sy1ω. When duty ratio DR is 1%, detection output F1 increases up to the voltage of 99.98% of maximum value H of angular velocity signal component Sy1ω, thereby efficiently detecting angular velocity signal component Sy1ω.

The operation of synchronous detection circuit 104 has been described so far. Synchronous detection circuit 105 shown in FIG. 25 performs a similar operation. However, the driving signal component and the angular velocity signal component included in sensor signal Sy2 input to synchronous detection circuit 105 are shifted in phase by 180 degrees from the signal components input to synchronous detection circuit 104. Therefore, the period for sampling by sampling pulse SP is before and after the period in which the angular velocity signal component input to synchronous detection circuit 105 is smallest. Thus, with the duty ratio of sampling pulse SP being reduced, detection output F2 of synchronous detection circuit 105 converges to the voltage at the minimum value of the angular velocity signal component input to synchronous detection circuit 105.

In this manner, the efficiency of detecting the angular velocity signal components included in the sensor signals input to synchronous detection circuits 104 and 105 can be increased by reducing the duty ratio of sampling pulse SP. Furthermore, since sampling is performed before and after zero cross point Zc of the driving signal component, the driving signal component comes closer to zero with the smaller duty ratio of sampling pulse SP, thereby improving the signal removing effect for the driving signal component.

Setting duty ratio DR of sampling pulse SP as described above increases the efficiency of detecting detection output F1 and detection output F2 for angular velocity signal component Sy1d and angular velocity signal component Sy2K input to synchronous detection circuits 104 and 105 and improves the signal removing effect for the driving signal component.

The embodiment disclosed here should be understood as being illustrative rather than being limitative in all respects. The scope of the present invention is shown not in the foregoing description but in the claims, and it is intended that all modifications that come within the meaning and range of equivalence to the claims are embraced here.

INDUSTRIAL APPLICABILITY

The synchronous detection circuit according to the present invention can increase the efficiency of detecting an angular signal component included in a sensor signal input to the synchronous detection and can output a detection output in accordance with the actual magnitude of the angular velocity signal component. Furthermore, the signal removing effect for a driving signal component can be improved. The synchronous detection circuit of the present invention can be used to provide an angular velocity sensor with high detection efficiency and therefore has a high industrial applicability.

REFERENCE SIGNS LIST

D1 to D4, E1 to E4, E11 to E18 piezoelectric element, 1, 41 main unit, 2 main substrate, 3 cylindrical portion, 4 flexible portion, 5 support portion, 6 groove, 7 auxiliary substrate, 8 mass portion, 9 frame portion, 10 support substrate, 11 upper electrode, 12 lower electrode, 13 piezoelectric material layer, 15, 45 electric circuit unit, 16, 17, 46, 47 operation circuit, 18, 48 driving circuit, 21, 22, 51, 52 Q/V conversion circuit, 23, 55, 62 subtraction circuit, 24, 56 signal generation circuit, 30, 33, 36 operation amplifier, 31, 34, 37 to 40 resistor element, 32, 35, 111 capacitor, 53, 54 sampling circuit, 63 waveform conversion circuit, 64 pulse generation circuit, 65 timing correction circuit, 66 phase-locked loop circuit, 67, 69 frequency divider, 68 sinusoidal wave generation circuit, 70 level shifter, 71 switch, 72 amplifier, 73, 110 resistor element, 74 rectangular wave generation circuit, 75 delay circuit, 80 phase comparator, 81 charge pump, 82 loop filter, 83 voltage-controlled oscillator, 90 counter, 91 decoder, 92 D/A converter, 93 band-pass filter, 100 angular velocity sensor, 101 sensor unit, 102, 103 charge amplifier, 104, 105 synchronous detection circuit, 106, 107 low-pass filter, 108 differential amplifier.

What is claimed is:
1. An angular velocity sensor comprising:
an annular flexible portion arranged along an XY plane and having a center through which a Z axis passes through;
a mass portion supported on an inner edge of said flexible portion;

a support portion for supporting an outer edge of said flexible portion;

a driving portion for vibrating said mass portion in a direction of said Z axis; and a detection portion for detecting an angular velocity around an X axis or a Y axis, based on vibration of said mass portion, said driving portion including:

a first piezoelectric element fixed to said flexible portion for vibrating said mass portion, a second piezoelectric element fixed to said flexible portion for detecting vibration of said mass portion, a driving circuit for providing a driving signal to said first piezoelectric element, a delay circuit for delaying a phase of said driving signal by 90 degrees, and a phase control circuit for comparing a phase of an output signal of said second piezoelectric element and a phase of an output signal of said delay circuit and controlling the phase of said driving signal such that a phase difference between these signals is eliminated, wherein said phase control circuit is a phase-locked loop circuit including:

a voltage-controlled oscillator for generating a clock signal having a frequency in accordance with a control voltage, and a phase comparator for comparing the phase of the output signal of said delay circuit and the phase of the output signal of the second piezoelectric element and adjusting said control voltage such that a phase difference between these signals is eliminated, and said driving circuit generates said driving signal in synchronization with said clock signal.

2. The angular velocity sensor according to claim 1, wherein a first electrode of said first piezoelectric element is fixed to said flexible portion, and said driving circuit has a first signal generation circuit for generating a sinusoidal wave signal in synchronization with said clock signal, an amplifier for amplifying said sinusoidal wave signal, and a resistor element connected between an output node of said amplifier and a second electrode of said first piezoelectric element.

3. The angular velocity sensor according to claim 1, wherein a first electrode of said first piezoelectric element is fixed to said flexible portion, and said driving circuit has a frequency divider for dividing a frequency of said clock signal to generate a first rectangular wave signal, an amplifier for amplifying said first rectangular wave signal, and a resistor element connected between an output node of said amplifier and a second electrode of said first piezoelectric element.

4. The angular velocity sensor according to claim 1, wherein a first electrode of said first piezoelectric element is fixed to said flexible portion, and said driving circuit has a first signal generation circuit for generating a sinusoidal wave signal in synchronization with said clock signal, a frequency divider for dividing a frequency of said clock signal to generate a first rectangular wave signal, a switch circuit for selecting a desired signal from said sinusoidal wave signal and said first rectangular wave signal, an amplifier for amplifying the signal selected by said switch circuit, and a resistor element connected between an output node of said amplifier and a second electrode of said first piezoelectric element.

5. An angular velocity sensor comprising:

an annular flexible portion arranged along an XY plane and having a center through which a Z axis passes through;

a mass portion supported on an inner edge of said flexible portion;

a support portion for supporting an outer edge of said flexible portion;

a driving portion for vibrating said mass portion in a direction of said Z axis; and a detection portion for detecting an angular velocity around an X axis or a Y axis, based on vibration of said mass portion, said driving portion including:

a first piezoelectric element fixed to said flexible portion for vibrating said mass portion, a second piezoelectric element fixed to said flexible portion for detecting vibration of said mass portion, a driving circuit for providing a driving signal to said first piezoelectric element, a signal generation circuit for generating a rectangular wave signal in synchronization with said driving signal, a delay circuit for delaying a phase of said rectangular wave signal by 90 degrees, and a phase control circuit for comparing a phase of an output signal of said second piezoelectric element and a phase of an output signal of said delay circuit and controlling the phase of said driving signal such that a phase difference between these signals is eliminated, wherein a piezoelectric material layer between first and second electrodes of said first piezoelectric element is separated from a piezoelectric material layer between first and second electrodes of said second piezoelectric element.

6. An angular velocity sensor comprising:

an annular flexible portion arranged along an XY plane and having a center through which a Z axis passes through;

a mass portion supported on an inner edge of said flexible portion;

a support portion for supporting an outer edge of said flexible portion;

a driving portion for vibrating said mass portion in a direction of said Z axis; and a detection portion for detecting an angular velocity around an X axis or a Y axis, based on vibration of said mass portion, said driving portion including:

a first piezoelectric element fixed to said flexible portion for vibrating said mass portion;

a second piezoelectric element fixed to said flexible portion for detecting vibration of said mass portion;

a driving circuit for providing a driving signal to said first piezoelectric element, a first signal generation circuit for generating a first rectangular wave signal in synchronization with said driving signal;

a delay circuit for delaying a phase of said first rectangular wave signal by 90 degrees; and a phase control circuit for comparing a phase of an output signal of said second piezoelectric element and a phase of an output signal of said delay circuit and controlling the phase of said driving signal such that a phase difference between these signals is eliminated, wherein a first electrode of said second piezoelectric element is fixed to said flexible portion, the angular velocity sensor further comprising:

a first charge/voltage conversion circuit for converting a quantity of charge generated at the first electrode of said second piezoelectric element into voltage;

a second charge/voltage conversion circuit for converting a quantity of charge generated at a second electrode of said second piezoelectric element into voltage;

a subtraction circuit for finding a voltage which is a difference between output voltages of said first and second charge/voltage conversion circuits; and a waveform conversion circuit for converting a sinusoidal voltage signal output from said subtraction circuit into a second rectangular wave signal, wherein said phase comparator adjusts said control voltage such that a phase difference between said first and second rectangular wave signals is eliminated.

7. The angular velocity sensor according to claim 6, further comprising:

a second signal generation circuit for generating a sampling signal in synchronization with said second rectangular wave signal; and a timing correction circuit for correcting a timing of said sampling signal, said detection portion including a third piezoelectric element provided on a positive side of said X axis or said Y axis and having a first electrode fixed to said flexible portion, and a fourth piezoelectric element provided on a negative side of said X axis or said Y axis and having a first electrode fixed to said flexible portion, wherein the first and second electrodes of said third piezoelectric element are connected to the second and first electrodes of said fourth piezoelectric element, respectively, said detection portion further including a third charge/voltage conversion circuit for converting quantities of charge generated at the first electrode of said third piezoelectric element and the second electrode of said fourth piezoelectric element into voltage, a third charge/voltage conversion circuit for converting quantities of charge generated at the second electrode of said third piezoelectric element and the first electrode of said fourth piezoelectric element into voltage, and a fourth signal generation circuit for sampling peak values of output voltages of said third and fourth charge/voltage conversion circuits in response to said sampling signal and generating a signal indicating an angular velocity based on the sampled peak value.

8. A synchronous detection circuit for use in an angular velocity sensor, comprising:

an analog switch; and an integration circuit including a resistor element and a capacitor, wherein a sensor signal including a driving signal component and an angular velocity signal component superposed on each other is input to an input terminal of said analog switch, and an input node of said integration circuit is connected to an output terminal of said analog switch, ON/OFF of said analog switch is controlled by a sampling pulse having a same cycle as a cycle of said sensor signal, and a duty ratio of said sampling pulse is less than 50%, and said driving signal component and said angular velocity signal component are shifted in phase from each other by 90 degrees.

9. The synchronous detection circuit according to claim 8, wherein said sampling pulse goes to an activation level before and after a zero cross point of said driving signal component, and said analog switch enters an ON state when said sampling pulse is at the activation level.

10. The synchronous detection circuit according to claim 8, wherein a cut-off frequency determined by a time constant of said integration circuit is 1 KHz or higher.

11. A synchronous detection circuit for use in an angular velocity sensor, comprising:

an analog switch; and an integration circuit including a resistor element and a capacitor, wherein a sensor signal including a driving signal component and an angular velocity signal component superposed on each other is input to an input terminal of said analog switch, and an input node of said integration circuit is connected to an output terminal of said analog switch, ON/OFF of said analog switch is controlled by a sampling pulse having a same cycle as a cycle of said sensor signal, and a duty ratio of said sampling pulse is less than 50%, and said analog switch includes a MOS transistor.

12. A synchronous detection circuit for use in an angular velocity sensor, comprising:

an analog switch; and an integration circuit including a resistor element and a capacitor, wherein a sensor signal including a driving signal component and an angular velocity signal component superposed on each other is input to an input terminal of said analog switch, and an input node of said integration circuit is connected to an output terminal of said analog switch, ON/OFF of said analog switch is controlled by a sampling pulse having a same cycle as a cycle of said sensor signal, and a duty ratio of said sampling pulse is less than 50%, and a frequency of said driving signal is 1 KHz or higher.

13. A synchronous detection circuit for use in an angular velocity sensor, comprising:

an analog switch; and an integration circuit including a resistor element and a capacitor, wherein a sensor signal including a driving signal component and an angular velocity signal component superposed on each other is input to an input terminal of said analog switch, and an input node of said integration circuit is connected to an output terminal of said analog switch, ON/OFF of said analog switch is controlled by a sampling pulse having a same cycle as a cycle of said sensor signal, and a duty ratio of said sampling pulse is less than 50%, and a cut-off frequency determined by a time constant of said integration circuit is 1 KHz or higher.

14. An angular velocity sensor comprising a synchronous detection circuit, said synchronous detection circuit including:

an analog switch; and an integration circuit including a resistor element and a capacitor, wherein a sensor signal including a driving signal component and an angular velocity signal component superposed on each other is input to an input terminal of said analog switch, and an input node of said integration circuit is connected to an output terminal of said analog switch, ON/OFF of said analog switch is controlled by a sampling pulse having a same cycle as a cycle of said sensor signal, and a duty ratio of said sampling pulse is less than 50%, said angular velocity sensor further comprising two sets of:
- a low-pass filter for removing a high-frequency component from an output signal of said synchronous detection circuit; and
- a charge amplifier for converting a charge signal into a voltage signal and outputting the voltage signal as said sensor signal to said synchronous detection circuit, said angular velocity sensor further comprising:
- a sensor portion for outputting two charge signals shifted in phase from each other by 180 degrees to two said charge amplifiers, respectively, when angular velocity is detected; and
- a differential amplifier for amplifying a potential difference between output signals of two said low-pass filters.

\* \* \* \* \*